(12) United States Patent
Tanaka et al.

(10) Patent No.: US 10,235,000 B2
(45) Date of Patent: Mar. 19, 2019

(54) SENSING SYSTEM AND SEMICONDUCTOR DEVICE

(71) Applicant: Synaptics Incorporated, San Jose, CA (US)

(72) Inventors: Nobukazu Tanaka, Tokyo (JP); Takayuki Noto, Tokyo (JP); Tetsuo Tanemura, Tokyo (JP)

(73) Assignee: SYNAPTICS INCORPORATED, San Jose, CA (US)

( * ) Notice: Subject to any disclaimer, the term of this patent is extended or adjusted under 35 U.S.C. 154(b) by 0 days.

(21) Appl. No.: 15/789,103

(22) Filed: Oct. 20, 2017

(65) Prior Publication Data

US 2018/0113534 A1    Apr. 26, 2018

(30) Foreign Application Priority Data

Oct. 25, 2016 (JP) .................. 2016-208653

(51) Int. Cl.
*G06F 3/044* (2006.01)
*G06F 3/041* (2006.01)

(52) U.S. Cl.
CPC ............ *G06F 3/044* (2013.01); *G06F 3/0416* (2013.01)

(58) Field of Classification Search
CPC ............................... G06F 3/044; G06F 3/0416
See application file for complete search history.

(56) References Cited

U.S. PATENT DOCUMENTS

| 7,868,874 | B2 | 1/2011 | Reynolds | |
| 2011/0063154 | A1* | 3/2011 | Hotelling | H03M 3/494 341/143 |
| 2013/0162586 | A1* | 6/2013 | Erdogan | G06F 3/0416 345/174 |
| 2014/0049266 | A1* | 2/2014 | Heim | G01R 35/005 324/603 |
| 2014/0049497 | A1* | 2/2014 | Krah | G06F 3/0418 345/173 |
| 2016/0098118 | A1* | 4/2016 | Lin | G06F 3/044 345/174 |
| 2016/0126972 | A1* | 5/2016 | Chang | G06F 3/0416 345/173 |
| 2017/0324408 | A1* | 11/2017 | Yang | H03K 17/962 |
| 2018/0004317 | A1* | 1/2018 | Bohannon | G06F 3/041 |

* cited by examiner

*Primary Examiner* — Abhishek Sarma
(74) *Attorney, Agent, or Firm* — Patterson + Sheridan, LLP

(57) ABSTRACT

A sensing system includes: a transmitter circuitry configured to transmit drive signals to N sensors, N being a positive integer; N receiver circuitries configured to receive in parallel N sense signals generated in response to the drive signals by N sensors, N being a positive integer; N modulation circuitries configured to modulate outputs of the N receiver circuitries; a mixer circuitry configured to mix outputs of the N modulation circuitries; an A/D converter circuitry configured to receive an output of the mixer circuitry; and a demodulation circuitry. The demodulation circuitry is configured to demodulate an output of the A/D converter circuitry to generate N digital sense values corresponding to the N sense signals.

20 Claims, 13 Drawing Sheets

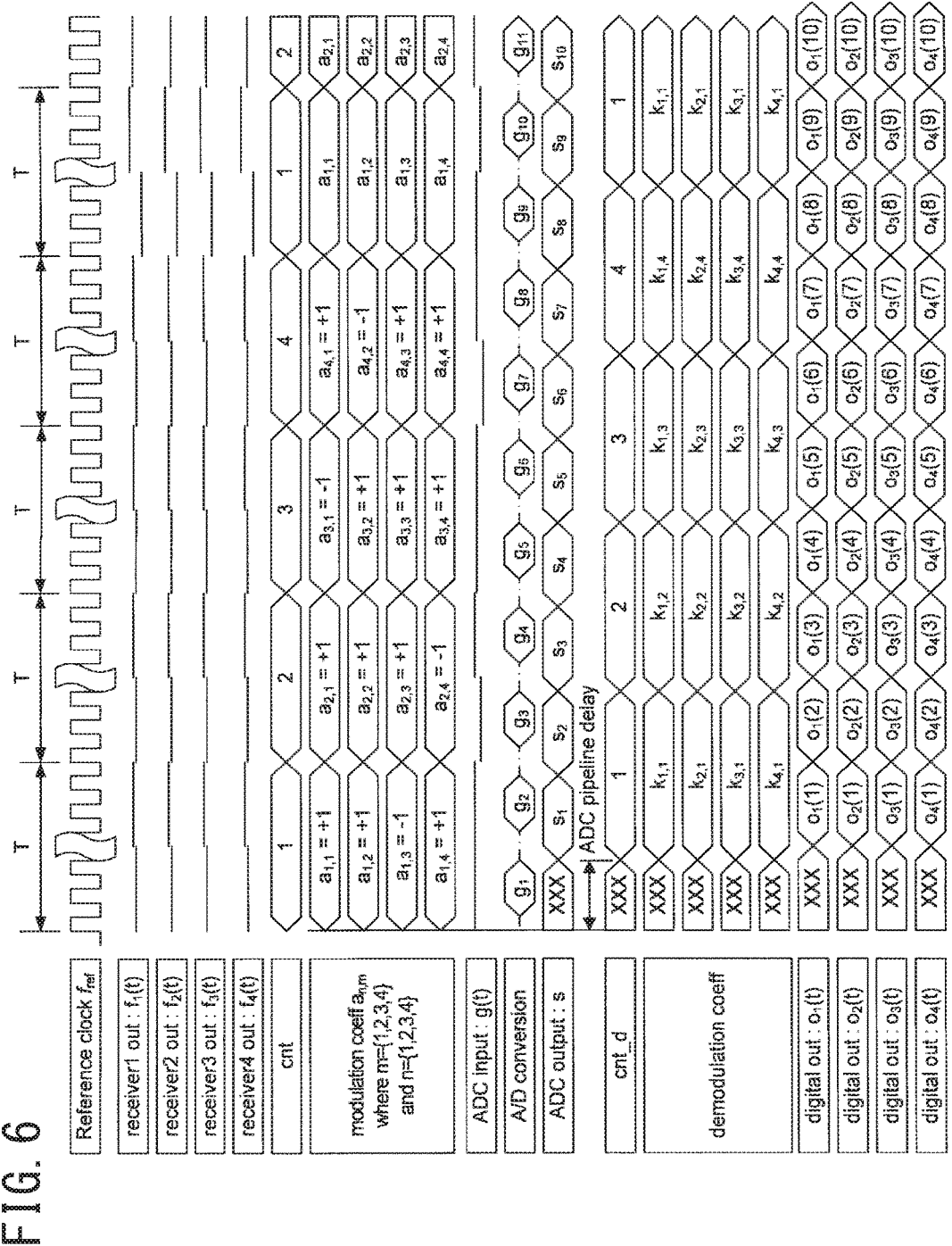
F I G. 6

SENSING SYSTEM AND SEMICONDUCTOR DEVICE

CROSS REFERENCE

This application claims priority of Japanese Patent Application No. 2016-208653, filed on Oct. 25, 2016, the disclosure of which is incorporated herein by reference.

TECHNICAL FIELD

The present disclosure relates to a sensing system, especially suitable for use in a touch sensing circuitry connected to a touch panel adapted to capacitive touch sensing and a semiconductor device incorporating the same.

BACKGROUND ART

In many implementations, touch sensing circuits adapted for capacitive touch sensing are designed to increase the number of electrodes with respect to which sensing can be performed at the same time. Such implementations provide for enhanced resolution and high quality of touch sensing. Commonly, a mutual capacitance touch panel comprises several hundreds of sensor capacitors arrayed in a matrix having several tens of rows each including several tens of sensor capacitors. The rows of sensor capacitors are sequentially selected and sensing is performed at the same time with respect to several tens of sensor capacitors in the selected row. Therefore, the number of electrodes with respect to which sensing is performed at the same time is in the order of several tens. For a self-capacitance touch panel in which each sensor capacitor includes a sensing electrode, sensing can be performed with respect to several hundreds of sensor capacitors at the same time. Each sensor electrode simultaneously sensed with is connected to a different touch sensing circuit. This configuration may even be applied to sensor layouts where there are several hundreds of sensor capacitors similarly arrayed in a matrix having several tens of rows each including several tens of sensor capacitors. However, the number of touch sensing circuits which can be actually integrated in a practical use is restricted by the hardware scale and cost. As such, the number of electrodes with respect to which sensing can be performed at the same time is accordingly restricted.

U.S. Pat. No. 7,868,874 discloses a touch sensing circuit which provides multiplexing of sensing channels through code modulation. The touch sensing circuit is connected to a mutual capacitance touch panel which includes drive electrodes, sensing electrodes and sensor capacitors formed at respective intersections at which the drive electrodes and the sensing electrodes intersect with each other. The signals received by the sensing electrodes are multiplexed into multiple sensing channels by driving the drive electrodes with pulses modulated with codes orthogonal with each other and demodulating the signals received by the sensing electrodes with the corresponding codes. This achieves spectrum spreading of the noise and effectively improves the signal-to-noise ratio (SNR).

SUMMARY

In one embodiment, a sensing system includes: a transmitter circuitry configured to transmit drive signals to N sensors; N receiver circuitries configured to receive in parallel N sense signals generated in response to the drive signals by the N sensors; N modulation circuitries configured to modulate the outputs of the N receiver circuitries, a mixer circuitry configured to mix the outputs of the N modulation circuitries, an A/D converter circuit configured to receive the output of the mixing circuit; and a demodulation circuitry configured to demodulate an output of the A/D converter circuit to generate N digital sense values respectively corresponding to the N sense signals.

BRIEF DESCRIPTION OF THE DRAWINGS

FIG. 6 is a timing chart illustrating another operation example of the sensing system according to the third embodiment;

DETAILED DESCRIPTION

Embodiment 1

Figure 1:
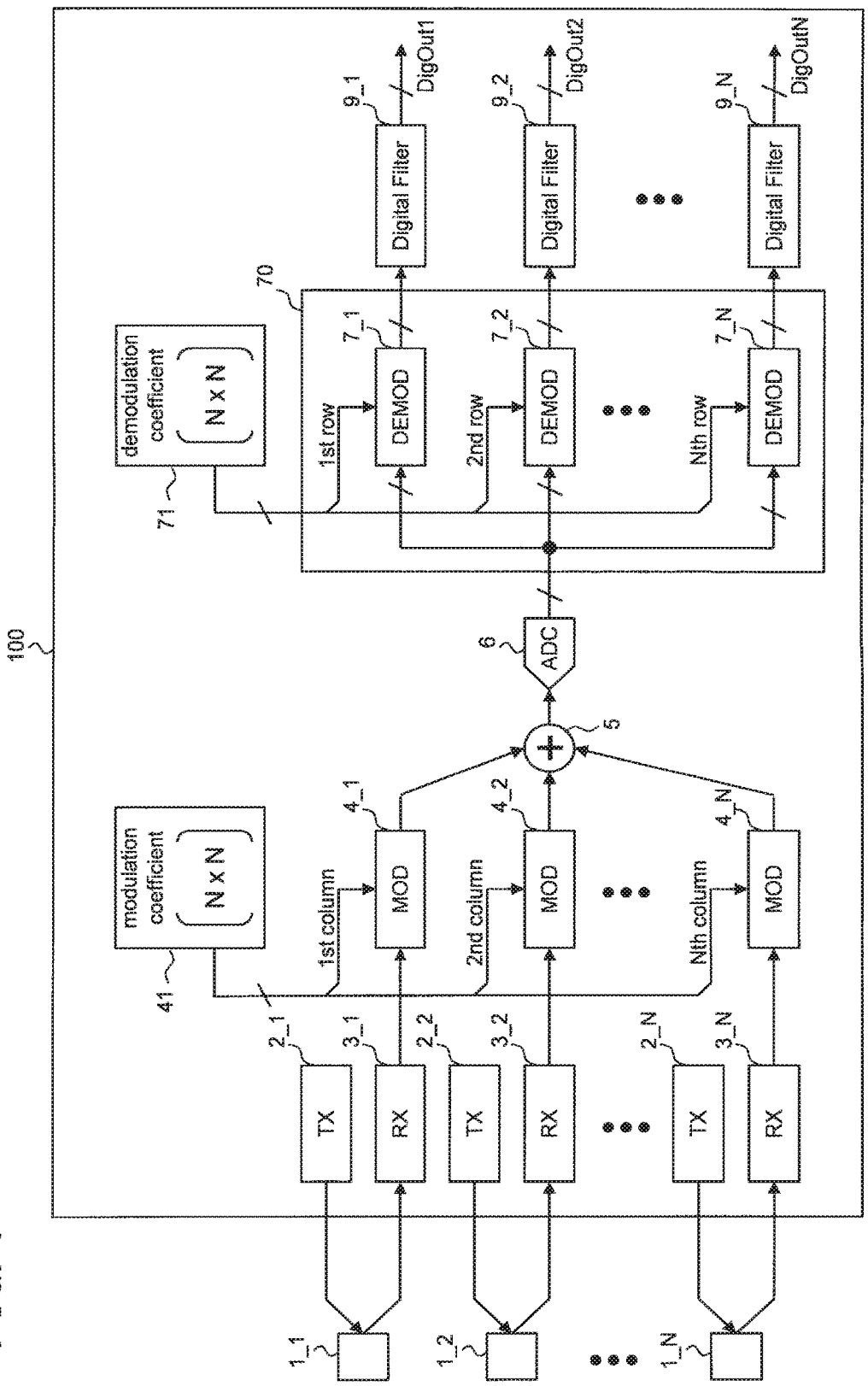
FIG. 1 is a block diagram schematically illustrating the configuration of a sensing system according to a first embodiment.

FIG. 1 is a block diagram schematically illustrating the configuration of a sensing system in one embodiment.

In various embodiments, the sensing system, denoted by numeral 100, is configured to achieve sensing with respect to N sensors 1_1 to 1_N. In the illustrated embodiment, the sensing system 100 includes transmitter circuitries (TX) 2_1 to 2_N, receiver circuitries (RX) 3_1 to 3_N, modulation circuitries (MOD) 4_1 to 4_N, a mixer circuitry 5, an A/D converter circuitry 6 and a demodulation circuitry 70.

The transmitter circuitries 2_1 to 2_N are configured to drive drive signals onto the N sensors 1_1 to 1_N over at least N cycles. The waveforms of the drive signals transmitted to the N sensors 1_1 to 1_N may be different, while a drive signal with substantially the same waveform is driven onto each sensor over the N cycles. The "substantially the same waveform" may include a variation of a level generally allowed in industrial use. Although it is preferable that the waveform of a drive signal in each cycle is completely unchanged over the N cycles in theory, the effect of the included error is limited to the sensing accuracy. Accordingly, the allowed variation level may be determined in accordance with a distribution scheme for satisfying a required sensing accuracy.

In one or more embodiment, the receiver circuitries 3_1 to 3_N are configured to receive in parallel the N sense signals generated by the N sensors 1_1 to 1_N in response to the drive signals over N cycles.

The modulation circuitries 4_1 to 4_N may be configured to be supplied with modulation coefficients 41 represented as an N-row and N-column matrix, and sequentially supply N products obtained by multiplying the N sense signals by the N elements of each of the first to $N^{th}$ rows of the modulation coefficients 41 in each of the N cycles.

The mixer circuitry 5 may be configured to supply the sum of the N products supplied every cycle to the A/D converter circuitry 6. As a result, the N sense signals from the N measurement channels including the N sensors 1_1 to 1_N, the N transmitter circuitries 2_1 to 2_N and the N receiver circuitries 3_1 to 3_N are code-modulated with the modulation coefficients 41, summed up by the mixer circuitry 5 in each cycle, and then supplied to the A/D converter circuitry 6 as an analog signal over the N cycles.

The A/D converter circuitry 6 may be configured to sequentially output the digital value corresponding to the output of the mixer circuitry 5 in each of the N cycles, to thereby output N digital signals over the N cycles in total.

The demodulation circuitry 70 may be configured to receive demodulation coefficients 71 represented as an N-row and N-column matrix orthogonal to the modulation coefficients 41, and output N digital sense values DigOut1 to DigOutN. In one embodiment, the demodulation circuitry 70 is configured to output the N digital sense values DigOut1 to DigOutN by multiplying the N digital signals received from the A/D converter circuitry 6 over the N cycles by the demodulation coefficients 71, defining an N-row and one-column input matrix with the N digital signals.

In one or more embodiments, the sensing system 100 allows for a reduction in the number of the A/D converter circuitry 6 disposed to convert the N sense signals associated with the N sensors 1_1 to 1_N into digital values in parallel down to one.

More specifically, the demodulation circuitry 70 may include demodulation circuitries 7_1 to 7_N associated with the respective channels. The demodulation circuitries 7_1 to 7_N may be configured to sequentially receive the elements of the respective rows of the demodulation coefficients 71 at intervals of one cycle. The demodulation circuitry 70 may include digital filters 9_1 to 9_N connected to the outputs of the demodulation circuitries 7_1 to 7_N.

A detail description is given below of the operation of the sensing system 100 according to one or more embodiments.

The sense signals "RX-1 out" to "RX-N out" received by the receiver circuitries 3_1 to 3_N are represented by the following expressions:

$$\begin{aligned} RX-1 \text{ out:} \quad & f_1(t) \quad f_1(t+T) \quad \ldots \quad f_1(t+(N-1)T) \\ RX-2 \text{ out:} \quad & f_2(t) \quad f_2(t+T) \quad \ldots \quad f_2(t+(N-1)T) \\ & \vdots \quad \vdots \quad \vdots \quad \ddots \quad \vdots \\ RX-N \text{ out:} \quad & f_N(t) \quad f_N(t+T) \quad \ldots \quad f_N(t+(N-1)T) \end{aligned} \quad (1)$$

As the waveform of each drive signal in each cycle is unchanged over the N cycles, the waveform of the sense signal corresponding thereto is expected to be unchanged over the N cycles. When a sense value of a sensor varies at intermediate timing of the N cycles, the corresponding sense signal also varies, and the variation in the sense signal may be handled as an error.

$$\begin{aligned} f_1(t) &= f_1(t+T) = \ldots = f_1(t+(N-1)T) \\ f_2(t) &= f_2(t+T) = \ldots = f_2(t+(N-1)T) \\ &\vdots \quad \vdots \quad \vdots \\ f_N(t) &= f_N(t+T) = \ldots = f_N(t+(N-1)T) \end{aligned} \quad (2)$$

The sense signals are represented as an N-row and N-column matrix in which the rows respectively represent the N channels and the columns respectively represent the N cycles, and modulated with the N-row and N-column modulation coefficients 41 (where the elements are denoted by $a_{1,1}$ to $a_{N,N}$, hereinafter). This is achieved by multiplication of these matrices. The product is calculated as an N-row and N-column matrix as follows:

$$\begin{pmatrix} a_{1,1} & a_{1,2} & \cdots & a_{1,N} \\ a_{2,1} & a_{2,2} & \cdots & a_{2,N} \\ \vdots & \vdots & \ddots & \vdots \\ a_{N,1} & a_{N,2} & \cdots & a_{N,N} \end{pmatrix} \times \begin{pmatrix} f_1(t) & f_1(t+T) & \cdots & f_1(t+(N-1)T) \\ f_2(t) & f_2(t+T) & \cdots & f_2(t+(N-1)T) \\ \vdots & \vdots & \ddots & \vdots \\ f_N(t) & f_N(t+T) & \cdots & f_N(t+(N-1)T) \end{pmatrix} = \quad (3)$$

$$\begin{pmatrix} g_1 & g_1 & \cdots & g_1 \\ g_2 & g_2 & \cdots & g_2 \\ \vdots & & \ddots & \vdots \\ g_N & g_N & \cdots & g_N \end{pmatrix}$$

As the waveform of each drive signal in each cycle is unchanged over the N cycles, the respective elements of different columns of the product matrix have the same values; the elements of the respective rows, which are represented by the following 6 and converted into digital values.

$$\begin{aligned} ADC \quad & \text{input:} & & & ADC \text{ output} \quad (4) \\ g_1 &= a_{1,1} \times f_1(t) + a_{1,2} \times f_2(t) + \ldots + a_{1,N} \times f_N(t) & \Rightarrow & s_1 \\ g_2 &= a_{2,1} \times f_1(t) + a_{2,2} \times f_2(t) + \ldots + a_{2,N} \times f_N(t) & \Rightarrow & s_2 \\ & \vdots & & \vdots \\ g_N &= a_{N,1} \times f_1(t) + a_{N,2} \times f_2(t) + \ldots + a_{N,N} \times f_N(t) & \Rightarrow & s_N \end{aligned}$$

The inputs $g_1$ to $g_N$ of the A/D converter circuitry 6 can be represented with an N-row and one-column matrix. In the sensing system 100, the inputs $g_1$ to $g_N$ are sequentially input to the A/D converter circuitry 6 at intervals of one cycle and sequentially converted into digital values $s_1$ to $s_N$. In other words, the N digital values $s_1$ to $s_N$ corresponding to $g_1$ to $g_N$ generated through code modulation and mixture are output from A/D converter circuitry 6 over the N cycles.

The demodulation coefficients 71 are represented as an N-row and N-column matrix (the elements are denoted by $k_{1,1}$ to $k_{N,N}$, hereinafter) orthogonal to the matrix of the modulation coefficients 41, the product of the matrix of the demodulation coefficients 71 and the matrix of modulation coefficients 41 is an identity matrix as follows.

$$\begin{pmatrix} k_{1,1} & k_{1,2} & \cdots & k_{1,N} \\ k_{2,1} & k_{2,2} & \cdots & k_{2,N} \\ \vdots & \vdots & \ddots & \vdots \\ k_N & k_{N,2} & \cdots & k_{N,N} \end{pmatrix} \times \begin{pmatrix} a_{1,1} & a_{1,2} & \cdots & a_{1,N} \\ a_{2,1} & a_{2,2} & \cdots & a_{2,N} \\ \vdots & \vdots & \ddots & \vdots \\ a_{N,1} & a_{N,2} & \cdots & a_{N,N} \end{pmatrix} = \begin{pmatrix} 1 & 0 & \cdots & 0 \\ 0 & 1 & \cdots & 0 \\ \vdots & \vdots & \ddots & \vdots \\ 0 & 0 & \cdots & 1 \end{pmatrix} \quad (5)$$

The N digital values $s_1$ to $s_N$ are expanded to N columns to define an N-row and N-column matrix so that each column includes elements respectively equal to the N digital values $s_1$ to $s_N$, and a demodulation output is calculated by multiplying this N-row and N-column matrix by the demodulation coefficients 71 as follows.

$$\begin{pmatrix} k_{1,1} & k_{1,2} & \cdots & k_{1,N} \\ k_{2,1} & k_{2,2} & \cdots & k_{2,N} \\ \vdots & \vdots & \ddots & \vdots \\ k_{N,1} & k_{N,2} & \cdots & k_{N,N} \end{pmatrix} \times \begin{pmatrix} s_1 & s_1 & \cdots & s_1 \\ s_2 & s_2 & \cdots & s_2 \\ \vdots & & \ddots & \vdots \\ s_N & s_N & \cdots & s_N \end{pmatrix} = \begin{pmatrix} d_1 & d_1 & \cdots & d_1 \\ d_2 & d_2 & \cdots & d_2 \\ \vdots & \vdots & \ddots & \vdots \\ d_N & d_N & \cdots & d_N \end{pmatrix} \quad (6)$$

Since the waveform of each drive signal in each cycle is unchanged over the N cycles, the elements of all the columns of the demodulation output are expected to be the same values; the demodulation results $d_1$ to $d_N$ of the respective rows are determined as the digital sense values DigOut1($o_1$) to DigOutN($o_N$) of the respective channels as follows.

demodulator output                                   digital out: (7)

$d_1 = k_{1,1} \times s_1 + k_{1,2} \times s_2 + \ldots + k_{1,N} \times s_N \quad \Rightarrow \quad o_1$ $d_2 = k_{2,1} \times s_1 + k_{2,2} \times s_2 + \ldots + k_{2,N} \times s_N \quad \Rightarrow \quad o_2$ $\vdots \qquad\qquad\qquad\qquad\qquad\qquad \vdots$ $d_N = k_{N,1} \times s_1 + k_{N,2} \times s_2 + \ldots + k_{N,N} \times s_N \quad \Rightarrow \quad o_N$ As described above, since the waveform of each drive signal in each cycle is unchanged while the N sensors are driven over the N cycles, the number of times of A/D conversion per cycle is reduced down to one, and the number of the A/D converter circuitry 6 to be disposed to convert the N sense signals associated with the N sensors 1_1 to 1_N into digital values in parallel is reduced down to one.

Embodiment 2

Figure 2:
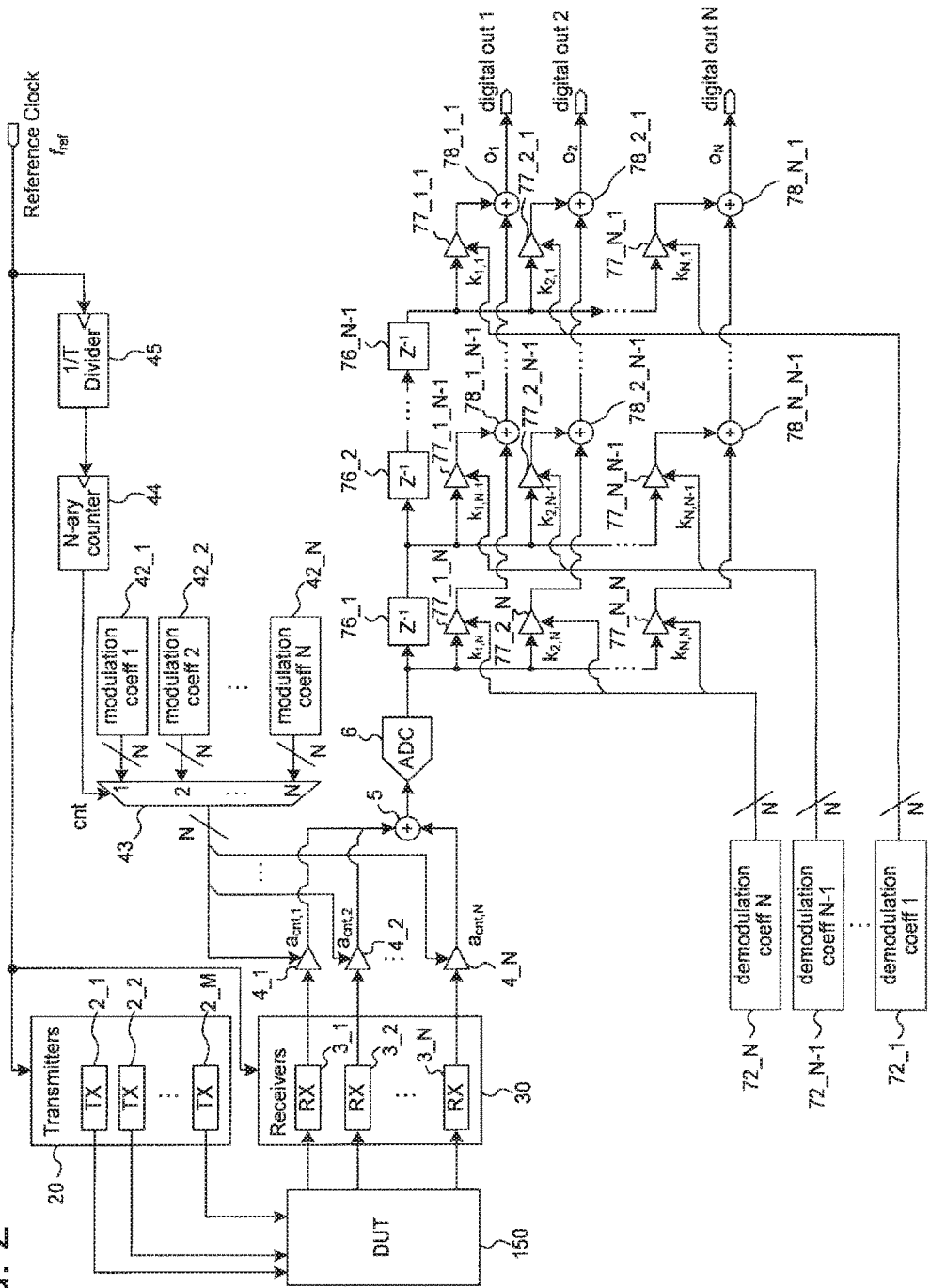
FIG. 2 is a block diagram illustrating a configuration example of a sensing system according to a second embodiment.

FIG. 2 is a block diagram illustrating a configuration example of a sensing system 100 according to a second embodiment. A sensing target (DUT) 150 includes N sensors 1_1 to 1_N (not illustrated).

In one embodiment, a transmitter circuitry 20 may include M transmitter circuits 2_1 to 2_M and a receiver circuitry 30 may include N receiver circuits 3_1 to 3_N. In various embodiments, the number of the transmitter circuits may be different than the number of the receiver circuits. As described with regard to the first embodiment, the transmitter circuitry 20 is at least configured to repeatedly apply drive signals to the N sensors 1_1 to 1_N over at least N cycles.

In one or more embodiments, a modulation coefficient supply circuit which supplies the modulation coefficients 41 includes a frequency divider circuit 45 which performs frequency dividing on a reference clock of a frequency $f_{ref}$ by T, an N-ary counter 44, storage circuitries 42_1 to 42_N holding the values of the elements of the respective columns of the modulation coefficients and a selector 43.

The reference clock may be used to synchronously operate the entire of the sensing system 100; the reference clock is also supplied to the transmitter circuitry 20 and the receiver circuitry 30. The frequency divider circuit 45 performs frequency dividing on the reference clock by T, where T is a positive integer defining each of the N cycles during which the drive signals are supplied. Although not illustrated, the reference clock or a clock generated through frequency dividing thereof is also supplied to the A/D converter circuitry 6 and digital circuitries connected to the output of the A/D converter circuitry 6, including the demodulation circuitry 70.

The N-ary counter 44 counts a count value cnt every cycle with the allowed count value range from one to N to output the count value cnt. The storage circuitries 42_1 to 42_N store the values of the elements of the respective columns of the modulation coefficients 41 or codes indicating the same. The elements $a_{1,1}$ to $a_{1,N}$ of the first column of the modulation coefficients 41 are stored in the storage circuitry 42_1, the elements $a_{2,1}$ to $a_{2,N}$ of the second column are stored in the storage circuitry 42_2, and the elements $a_{N,1}$ to $a_{N,N}$ of the $N^{th}$ column are stored in the storage circuitry 42_N. A similar approach may be applied to the other columns. In various embodiments, when the value of each element is selected from +1 and −1, the value of each element may be associated with one-bit digital code "1" or "0". The selector 43 reads out the values of one column or codes indicating the same every cycle in response to the count value cnt and supplies the values or codes to the modulation circuitries 4_1 to 4_N. In one embodiment, the storage circuitries 42_1 to 42_N may be implemented as one memory or a region of one memory and the values or codes may be read out from the memory in response to the count value cnt.

The modulation circuitries 4_1 to 4_N may be configured, for example, as analog multiplier circuitries which multiply the N sense signals supplied from the receiver circuitries 3_1 to 3_N by the modulation coefficients supplied from the modulation coefficient supply circuit. The mixer circuitry 5 may be configured to sum the outputs of the modulation circuitries 4_1 to 4_N and output the sum to the A/D converter circuitry 6. When the modulation circuitries 4_1 to 4_N are each configured as a current-output analog multiplier circuit, the mixer circuitry 5 is configured to short-circuit the signal lines receiving the output signals from the modulation circuitries 4_1 to 4_N. This allows the mixer circuitry 5 to function as an adder circuit adding the current levels. In an alternative embodiment, the modulation circuitries 4_1 to 4_N may be each configured as a voltage-output analog multiplier circuit. In such an embodiment, the mixer circuitry 5 may be configured to achieve voltage addition.

The A/D converter circuitry 6 may be configured to sequentially output a digital value corresponding to the output of the mixer circuitry 5 every cycle, to thereby output N digital signals over the N cycles.

The demodulation circuitry may include N−1 serially-connected delay circuitries 76_1 to 76_N−1 each having a delay of one cycle, and N product-sum calculation circuitries. In one embodiment, the demodulation coefficients are supplied in parallel from storage circuitries 72_1 to 72_N storing the values of the elements of the respective columns.

In various embodiments, the N product-sum calculation circuitries are respectively associated with the N channels. Further, the product-sum calculation circuitry associated with the first channel may include multipliers 77_1_1 to 77_1_N and adders 78_1_1 to 78_1_N−1, the product-sum calculation circuitry associated with the second channel may include multipliers 77_2_1 to 77_2_N and adders 78_2_1 to 78_2_N−1, and the product-sum calculation circuitry associated with the $N^{th}$ channel may include multipliers 77_N_1 to 77_N_N and adders 78_N_1 to 78_N_N−1. The similar goes for other channels.

In one embodiment, the multiplier circuitries 77_1_1 to 77_1_N in the product-sum calculation circuitry may be associated with the first channel are respectively supplied with the values $k_{1,1}$ to $k_{1,N}$ of the N elements in the first row of the demodulation coefficients or the codes representing the same. The digital output (denoted by "digital out 1" or "$o_1$") corresponding to the sense signal of the first channel is generated by multiplying the outputs of the A/D converter circuitry 6 and the N−1 delay circuitries 76_1 to 76_N−1 by the values $k_{1,1}$ to $k_{1,N}$ of the N elements and summing the products obtained by this multiplication.

In one embodiment, the multiplier circuitries 77_2_1 to 77_2_N in the product-sum calculation circuitry associated with the second channel are respectively supplied with the values $k_{2,1}$ to $k_{2,N}$ of the N elements in the second row of the demodulation coefficients. The digital output (denoted by "digital out 2" or "$o_2$") corresponding to the sense signal of the second channel is generated by multiplying the outputs of the A/D converter circuitry 6 and the N−1 delay circuitries 76_1 to 76_N−1 by the values $k_{2,1}$ to $k_{2,N}$ of the N elements and summing the products obtained by this multiplication. The remaining channels may be operated in a similar way.

In one embodiment, the multiplier circuitries 77_N_1 to 77_N_N in the product-sum calculation circuitry associated with the $N^{th}$ channel are respectively supplied with the values $k_{N,1}$ to $k_{N,N}$ of the N elements in the $N^{th}$ row of the demodulation coefficients. The digital output (denoted by "digital out N" or "$o_N$") corresponding to the sense signal of the $N^{th}$ channel is generated by multiplying the outputs of the A/D converter circuitry 6 and the N−1 delay circuitries 76_1 to 76_N−1 by the values $k_{N,1}$ to $k_{N,N}$ of the N elements and summing the products obtained by this multiplication.

In various embodiments, the N product-sum calculation circuitries respectively associated with the N channels generate the N digital sense values (denoted by "digital out 1" to "digital out N" or "$o_1$" to "$o_N$") by multiplying the outputs of the A/D converter circuitry 6 and the N−1 delay circuitries 76_1 to 76_N−1 by the values the N elements of each of the first to $N^{th}$ rows of the demodulation coefficients 71 and summing the products.

This configuration allows easily designing the demodulation circuitry 70 as a circuit performing the matrix operation in accordance with the above-described expressions (7) can be configured with N product-sum calculation circuitries which share the delay stage (including the N−1 serially-connected delay circuitries).

A detailed description is given below of the operation of the sensing system 100.

Figure 3:
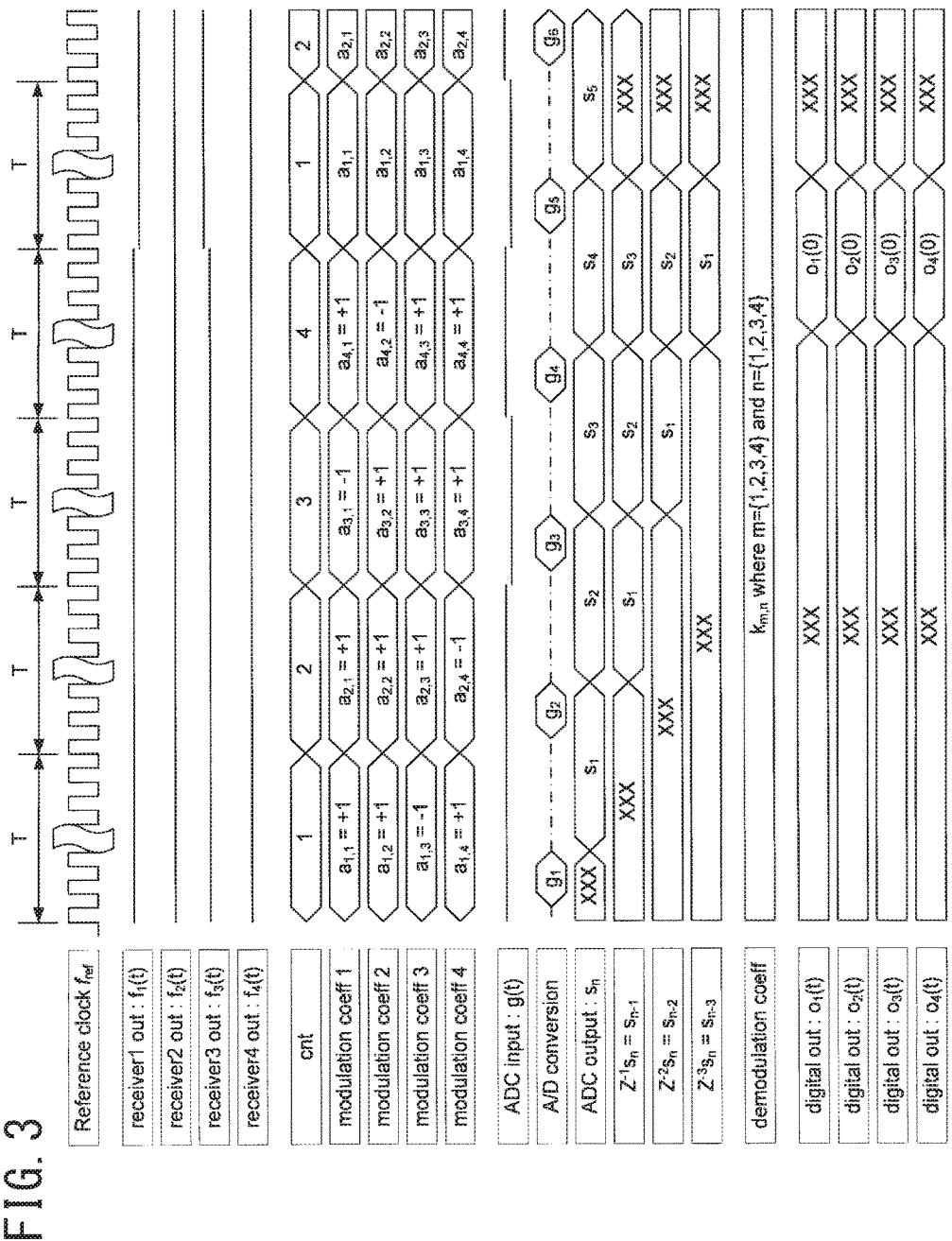
FIG. 3 is a timing chart illustrating an operation example of the sensing system according to the second embodiment.

FIG. 3 is a timing chart illustrating an operation example of the sensing system 100, in which N is four and the modulation coefficients and demodulation coefficients are defined with a cyclic code of {1, 1, −1, 1}. All of the numerical values in indicated in FIG. 3 are merely examples and may be modified as desired.

Each cycle is defined as T clock cycles of the reference clock. The operation in the leading four cycles, the subsequent one cycle and a part of the further subsequent cycle is illustrated.

The legends "receiver 1 out" to "receiver 4 out", which correspond to expressions (1), indicate the sense signals $f_1(t)$ to $f_4(t)$ received by the receiver circuitries 3_1 to 3_4, respectively. The sense signals $f_1(t)$ to $f_4(t)$ have waveforms responsive to the drive signals, each having the same waveform in the respective cycles, and the waveform of each of the sense signals $f_1(t)$ to $f_4(t)$ in each cycle is therefore expected to be unchanged over the four cycles (refer to expressions (2)). When the sense value of a sensor varies at intermediate timing of the four cycles, the corresponding sense signal also varies; this variation may be handled as an error.

The legend "cnt" indicates the output of the N-ary counter 44 (in this example, a quaternary counter); the count value cnt is counted up every cycle and cyclically takes a value from one to four at a cycle period of four cycles.

The legends "modulation coeff 1" to "modulation coeff 4" indicate the values of the elements of the modulation coefficients supplied to the modulation circuitries 4_1 to 4_4 associated with the respective channels. The modulation circuitry 4_1 associated with the first channel sequentially receives the elements $a_{1,1}$ to $a_{4,1}$ in the first to fourth rows and the first column of the modulation coefficients 41, and the modulation circuitry 4_2 associated with the second channel sequentially receives the elements $a_{1,2}$ to $a_{4,2}$ in the first to fourth rows and the second column of the modulation coefficients 41. The modulation circuitry 4_3 associated with the third channel sequentially receives the elements $a_{1,3}$ to $a_{4,3}$ in the first to fourth rows and the third column of the modulation coefficients 41, and the modulation circuit 4_4 associated with the fourth channel sequentially receives the elements $a_{1,4}$ to $a_{4,4}$ in the first to fourth rows and the fourth column of the modulation coefficients 41.

The legend "ADC input: g(t)" indicates the input signal of the A/D converter circuitry 6, which is an analog signal obtained by summing the outputs of the modulation circuitries 4_1 to 4_4 with the mixer circuitry 5. The input signal of the A/D converter circuitry 6 is associated with $g_1$ to $g_4$ in expressions (3) and (4), which are indicated by the legend "A/D conversion". The A/D converter input $g_5$ and $g_6$ following $g_1$ to $g_4$ in FIG. 3 indicate $g_1$ and $g_2$ in expressions (3) and (4) in the next four cycles.

The legend "ADC output: $s_n$" indicates the output of the A/D converter circuitry 6. The input signals $g_1$ to $g_4$ are sequentially supplied to the A/D converter circuitry 6 at intervals of one cycle over the four cycles and sequentially converted into digital values $s_1$ to $s_4$ at intervals of one cycle.

The legend "$z^{-1}s_n=s_{n-1}$" indicates the output of the first-stage delay circuitry 76_1, which is generated by delaying the output of the A/D converter circuitry 6 by one cycle and the legend "$z^{-2}s_n=s_{n-2}$" denotes the output of the second-stage delay circuitry 76_2, which is generated by delaying the output of the A/D converter circuitry 6 by two cycles. The legend "$z^{-3}s_n=s_{n-3}$" denotes the output of the third-stage delay circuitry 76_3, which is generated by delaying the output of the A/D converter circuitry 6 by three cycles. All of the A/D conversion outputs $s_1$ to $s_4$ are completely prepared in the fourth cycle from the start of the output from the A/D converter circuitry 6.

The legend "demodulation coeff" indicates the demodulation coefficients $k_{m,n}$ supplied in parallel from the storage circuitries 72_1 to 72_4, where m and n each range from one to four.

The legends "digital out: $o_1(t)$" to "digital out: $o_4(t)$" indicate the digital outputs of the respective channels. The digital outputs $o_1(0)$ to $o_4(0)$ calculated in accordance with the following expressions (8) in the cycle in which all of the A/D conversion outputs $s_1$ to $s_4$ are completely prepared are output as digital signals corresponding to the sense signals $f_1(0)$ to $f_4(0)$ in the leading four cycles.

$$o_1(0)=k_{1,1}s_1+k_{1,2}s_2+k_{1,3}s_3+k_{1,4}s_4$$

$$o_2(0)=k_{2,1}s_1+k_{2,2}s_2+k_{2,3}s_3+k_{2,4}s_4$$

$$o_3(0)=k_{3,1}s_1+k_{3,2}s_2+k_{3,3}s_3+k_{3,4}s_4$$

$$o_4(0)=k_{4,1}s_1+k_{4,2}s_2+k_{4,3}s_3+k_{4,4}s_4 \quad (8)$$

Embodiment 3

Figure 4:
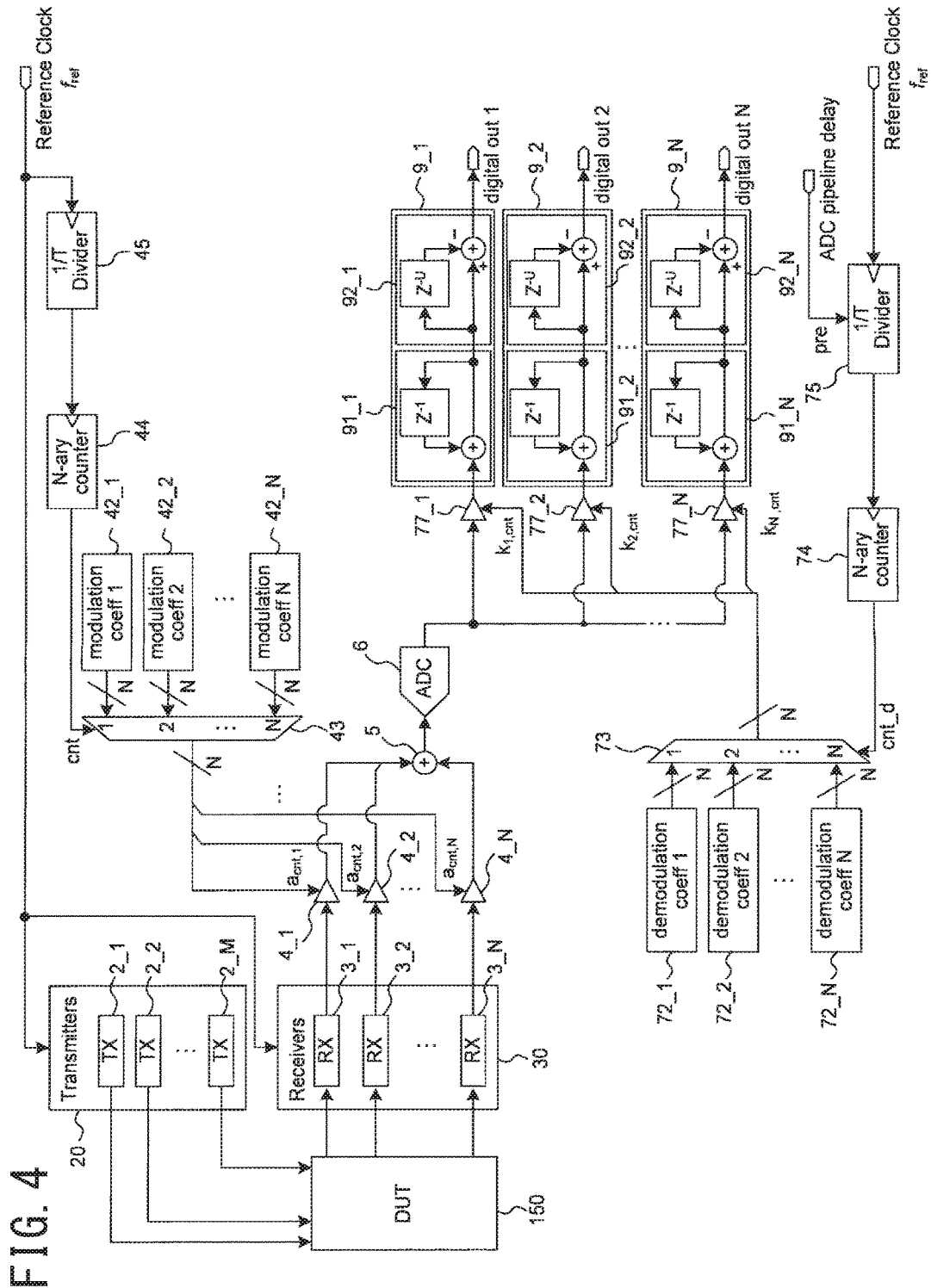
FIG. 4 is a block diagram illustrating a configuration example of a sensing system according to a third embodiment.

FIG. 4 is a block diagram illustrating a configuration example of a sensing system 100 according to a third embodiment. The sensing target 150 includes N sensors 1_1 to 1_N (not illustrated), and the circuit configuration to generate the input signal to the A/D converter circuitry 6 is the same as that in embodiment 2 illustrated in FIG. 2. The transmitter circuitry 20, the receiver circuitry 30, the frequency divider circuit 45, the N-ary counter 44, the storage circuitries 42_1 to 42_N, the selector 43, the modulation circuitries 4_1 to 4_N and the mixer circuitry 5 are configured and operated similarly to those in the sensing system 100 of embodiment 2 illustrated in FIG. 2; the details are omitted.

With further reference to the third embodiment, the A/D converter circuitry 6 performs delta-sigma conversion operation K times in each of the N cycles, and outputs the K digital data as the A/D conversion output digital signal in each of the N cycles. The sampling frequency of the A/D converter circuitry 6 in this embodiment 3 is one $S^{th}$ of the frequency $f_{ref}$ of the reference clock, where S=T/K, while that in embodiment 2 is one $T^{th}$ of the frequency $f_{ref}$ of the reference clock.

The demodulation circuitry 70 may include N multiplier circuitries 77_1 to 77_N and N digital filters 9_1 to 9_N to which the outputs of the N multiplier circuitries 77_1 to 77_N are supplied, which function as modulation circuitries associated with the N channels, respectively. The digital filters 9_1 to 9_N respectively may include first-order integration circuitries 91_1 to 91_N and (K×N)-order comb filters 92_1 to 92_N, which are cascade-connected.

A demodulation coefficient supply circuit, which supplies the demodulation coefficients 71, may include a frequency divider circuit 75, an N-ary counter 74, storage circuitries 72_1 to 72_N storing the values of the elements of the respective columns of the demodulation coefficients, and a selector 73. The frequency divider circuit 75 performs frequency dividing on the reference clock of the frequency $f_{ref}$ and outputs a frequency-divided clock with a delay corresponding to the delay caused by the pipeline processing in A/D converter circuitry 6.

The N-ary counter 74 may be configured to count a count value cnt_d every cycle with the allowed count value range from one to N to output the count value cnt_d. The storage circuitries 72_1 to 72_N store therein the values of the elements of the respective columns of the demodulation coefficients 71 or codes indicating the same. The values of the elements $k_{1,1}$ to $k_{1,N}$ of the first column of the demodulation coefficients 71 are stored in the storage circuitry 72_1, the values of the elements $k_{2,1}$ to $k_{2,N}$ of the second column are stored in the storage circuitry 72_2, and the values of the elements $k_{N,1}$ to $k_{N,N}$ of the second column are stored in the storage circuitry 72_N. Each of the remaining columns maybe operated in a similar way. When the allowed values of each element are +1 and −1, the allowed values may be associated with one-bit digital codes "1" and "0". The selector 73 reads out the values of the elements of the column selected by the count value cnt_d or the codes indicating the same every cycle, to supply to the multiplier circuitries 77_1 to 77_N, which function as a demodulator circuitry. The storage circuitries 72_1 to 72_N may be implemented as one memory or a region of one memory and the values or codes may be read out from the memory in response to the count value cnt.

The multiplier circuitry 77_1, which functions as a demodulation circuitry accommodating the first channel, receives the values $k_{1,1}$ to $k_{1,N}$ of the respective elements in the first rows or the codes indicating the same, and sequentially outputs the values obtained by multiplying the outputs of the A/D converter circuitry 6 by the values $k_{1,1}$ to $k_{1,N}$ of the respective elements. The first-order integration circuitry 91_1 in the front stage of the digital filter 9_1 calculates the accumulated sum of the products sequentially output from the multiplier circuitry 77_1 with one-cycle delay $Z^{-1}$ synchronous with a frequency $f_{ref}/S$, which is the sampling frequency of the A/D converter circuitry 6, and outputs the accumulated sum to the (K×N)-order comb filter 92_1. The (K×N)-order comb filter 92_1, which subtracts the value obtained by delaying the accumulated sum by a delay of U(=(N×T)/S), which corresponds to the delay of N cycles, from the accumulated sum received from the first-order integration circuitry 91_1, functions as a moving average filter calculating a moving average over the N cycles and outputs a digital output $o_1$ corresponding to the sense signal of the first channel, which is denoted by legends "digital out 1".

The multiplier circuitries 77_2 to 77_N and the digital filters 9_2 to 9_N, which are associated with other channels, may be configured to operate in a similar way.

This allows reducing the circuit size of the demodulation circuitry. The circuit size of the demodulation circuitry is largely reduced, compared with the circuit configuration which performs the matrix operation literally in accordance with the expressions as in the sensing system 100 of embodiment 2.

Figure 5:
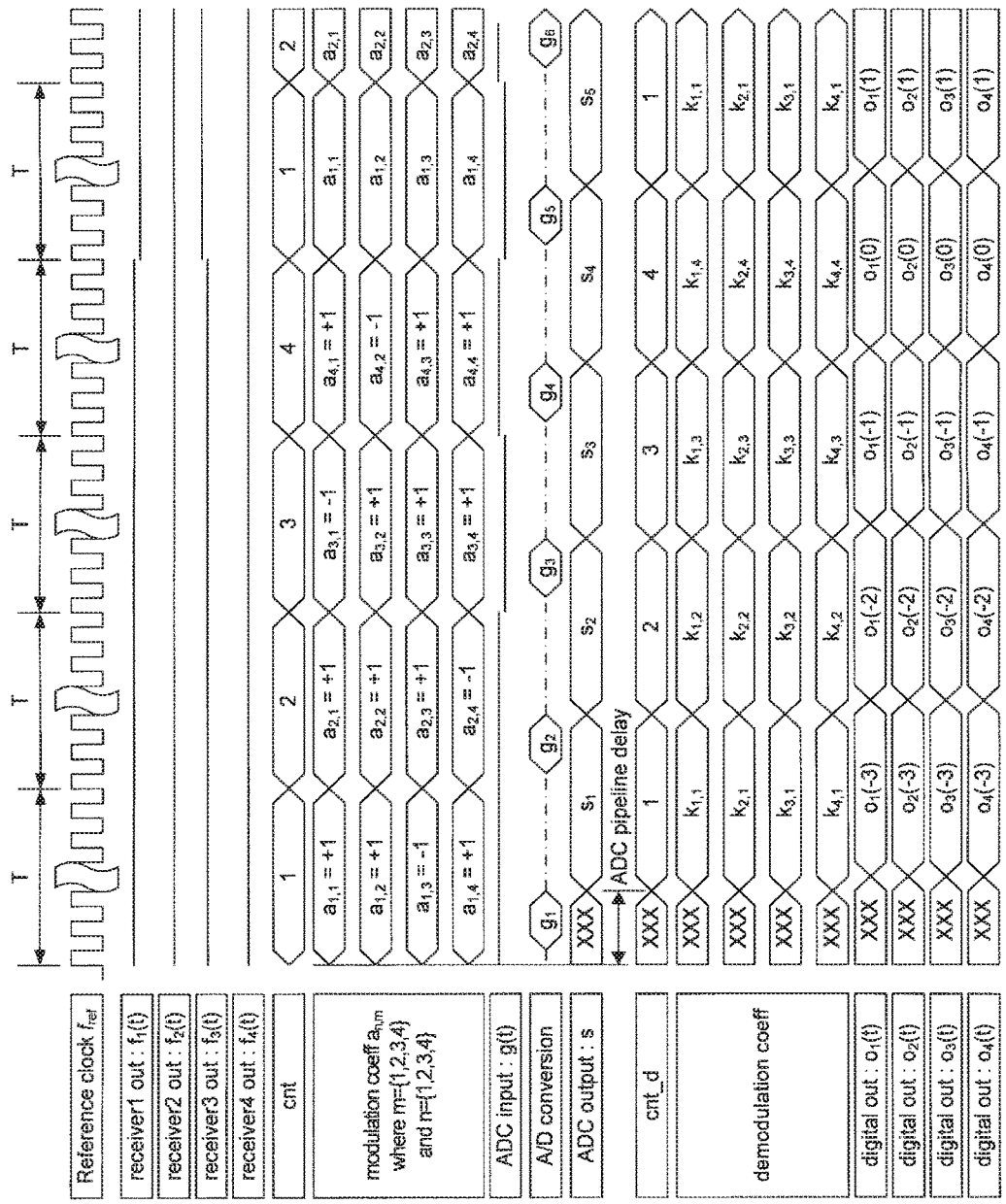
FIG. 5 is a timing chart illustrating an operation example of the sensing system according to the third embodiment.

FIG. 5 is a timing chart illustrating an operation example of the sensing system 100, in which N is four and the modulation coefficients and demodulation coefficients are defined with a cyclic code of {1, 1, −1, 1} as is the case with FIG. 3, where K=1 and S=T. In this case, the operation to generate the ADC output s of the A/D converter circuitry 6 is the same as that illustrated in FIG. 3; the details are omitted. All of the numerical values indicated in FIG. 5 are merely examples and may be modified as desired.

The legend "cnt_d" indicates the output of the N-ary counter 74 (in this example, a quaternary counter); the count value cnt_d is counted every cycle with a delay corresponding to the delay of the pipeline processing performed in the A/D converter circuitry 6, and cyclically takes a value from one to four at a cycle period of four cycles.

The legend "demodulation coeff" indicates the values of the elements of the demodulation coefficients respectively supplied to the multiplier circuitries 77_1 to 77_4, which operate as demodulation circuitries associated with the respective channels. The multiplier circuitry 77_1, which is associated with the first channel, receives the values of the elements $k_{1,1}$ to $k_{1,4}$ in the first row and the first to fourth columns of the demodulation coefficients 71, and the multiplier circuitry 77_2, which is associated with the second channel, receives the values of the elements $k_{2,1}$ to $k_{2,4}$ in the second row and the first to fourth columns of the demodulation coefficients 71. The multiplier circuitry 77_3, which is associated with the third channel, receives the values of the elements $k_{3,1}$ to $k_{3,4}$ in the third row and the first to fourth columns of the demodulation coefficients 71, and the multiplier circuitry 77_4, which is associated with the third channel, receives the values of the elements $k_{4,1}$ to $k_{4,4}$ in the fourth row and the first to fourth columns of the demodulation coefficients 71.

The legends "digital out: $o_1(t)$" to "digital out: $o_4(t)$" indicate the digital outputs of the respective channels. In the cycle in which the A/D conversion output $s_1$ is output from the A/D converter circuitry 6, $o_1(-3)$ to $o_4(-3)$, which are intermediate calculation values of the digital outputs, are output in accordance with the following expressions:

$$o_1(-3)=k_{1,1}s_1$$
$$o_2(-3)=k_{2,1}s_1$$
$$o_3(-3)=k_{3,1}s_1$$
$$o_4(-3)=k_{4,1}s_1 \qquad (9)$$

In the subsequent cycle, $o_1(-2)$ to $o_4(-2)$, which are next intermediate calculation values of the digital outputs, are output in accordance with the following expressions:

$$o_1(-2)=k_{1,1}s_1+k_{1,2}s_2$$
$$o_2(-2)=k_{2,1}s_1+k_{2,2}s_2$$
$$o_3(-2)=k_{3,1}s_1+k_{3,2}s_2$$
$$o_4(-2)=k_{4,1}s_1+k_{4,2}s_2 \qquad (10)$$

In the further subsequent cycle, $o_1(-1)$ to $o_4(-1)$, which are further subsequent intermediate calculation values, are output in accordance with the following expressions:

$$o_1(-1)=k_{1,1}s_1+k_{1,2}s_2+k_{1,3}s_3$$
$$o_2(-1)=k_{2,1}s_1+k_{2,2}s_2+k_{2,3}s_3$$
$$o_3(-1)=k_{3,1}s_1+k_{3,2}s_2+k_{3,3}s_3$$
$$o_4(-1)=k_{4,1}s_1+k_{4,2}s_2+k_{4,3}s_3 \qquad (11)$$

$o_1(0)$ to $o_4(0)$ calculated in accordance with the following expressions (12) in the third cycles after the cycle in which the A/D converter circuitry 6 starts to output the A/D conversion output are output as the digital signals corresponding to the sense signals $f_1(0)$ to $f_4(0)$ generated in the leading four cycles.

$$o_1(0)=k_{1,1}s_1+k_{1,2}s_2+k_{1,3}s_3+k_{1,4}s_4$$
$$o_2(0)=k_{2,1}s_1+k_{2,2}s_2+k_{2,3}s_3+k_{2,4}s_4$$
$$o_3(0)=k_{3,1}s_1+k_{3,2}s_2+k_{3,3}s_3+k_{3,4}s_4$$
$$o_4(0)=k_{4,1}s_1+k_{4,2}s_2+k_{4,3}s_3+k_{4,4}s_4 \qquad (12)$$

In the further subsequent cycle, $o_1(1)$ to $o_4(1)$ calculated in accordance with the following expressions (13) are output as the digital signals corresponding to the sense signals $f_1(1)$ to $f_4(1)$ generated in the second to fifth cycles.

$$o_1(1)=k_{1,1}s_5+k_{1,2}s_2+k_{1,3}s_3+k_{1,4}s_4$$
$$o_2(1)=k_{2,1}s_5+k_{2,2}s_2+k_{2,3}s_3+k_{2,4}s_4$$
$$o_3(1)=k_{3,1}s_5+k_{3,2}s_2+k_{3,3}s_3+k_{3,4}s_4$$
$$o_4(1)=k_{4,1}s_5+k_{4,2}s_2+k_{4,3}s_3+k_{4,4}s_4 \qquad (13)$$

As illustrated in FIG. 5, although suffering from an initial delay of the output of $o_1(0)$ to $o_4(0)$ as is the case with embodiment 2, the configuration of this embodiment 3 allows outputting the digital outputs $o_1(t)$ to $o_1(t)$ at a cycle period of one cycle, while the digital outputs $o_1(t)$ to $o_1(t)$ are output at a cycle period of four cycles in embodiment 2. In other words, the effective sampling frequency of the digital outputs $o_1(t)$ to $o_4(t)$ in embodiment 3 is N times as high as that in second embodiment.

FIG. 6 is a timing chart illustrating another operation example of the sensing system 100, in which N is four and the modulation coefficients and demodulation coefficients are defined with a cyclic code of $\{1, 1, -1, 1\}$ as is the case with FIG. 5, where K=2 and S=T/2, differently from those in FIG. 5. Therefore, the sampling frequency in the subsequent stages connected to the A/D conversion output, indicated in the legend "ADC output: s", is doubled. The operation for supplying the input to the A/D converter circuitry 6 and the operation of the circuit supplying the demodulation coefficients 71, which includes the frequency divider circuit 75, the N-ary counter 74 and the storage circuitries 72_1 to 72_N storing the values of the elements of the respective columns, and the selector 73 are the same as those in FIG. 5; the details are omitted.

As the A/D conversion output, indicated by the legend "ADC output: s", is output at the sampling frequency twice as high as that in FIG. 5, the A/D conversion results $s_1$ and $s_2$ associated with $g_1$ and $g_2$ are output in the first cycle, and then two of the A/D conversion results $s_3$, $s_4$, $s_5$, $s_6$, $s_7$, $s_8$, $s_9$ and $s_{10}$ are sequentially output every cycle.

In each cycle, the two A/D conversion results are multiplied by the same demodulation coefficients and the moving averages are calculated by the digital filters 9_1 to 9_4. Accordingly, the digital outputs $o_1(t)$ to $o_4(t)$ in each cycle are calculated as follows:

The digital outputs $o_1(1)$ to $o_4(1)$ in the former half of the first cycle are as follows:

$$o_1(1)=k_{1,1}s_1$$
$$o_2(1)=k_{2,1}s_1$$
$$o_3(1)=k_{3,1}s_1$$
$$o_4(1)=k_{4,1}s_1 \qquad (14)$$

The digital outputs $o_1(2)$ to $o_4(2)$ in the latter half of the first cycle are as follows:

$$o_1(2)=k_{1,1}(s_1+s_2)$$
$$o_2(2)=k_{2,1}(s_1+s_2)$$
$$o_3(2)=k_{3,1}(s_1+s_2)$$
$$o_4(2)=k_{4,1}(s_1+s_2) \qquad (15)$$

The digital outputs $o_1(3)$ to $o_4(3)$ in the former half of the second cycle are as follows:

$$o_1(3)=k_{1,1}(s_1+s_2)+k_{1,2}s_3$$

$$o_2(3)=k_{2,1}(s_1+s_2)+k_{2,2}s_3$$

$$o_3(3)=k_{3,1}(s_1+s_2)+k_{3,2}s_3$$

$$o_4(3)=k_{4,1}(s_1+s_2)+k_{4,2}s_3 \quad (16)$$

The digital outputs $o_1(4)$ to $o_4(4)$ in the latter half of the second cycle are as follows:

$$o_1(4)=k_{1,1}(s_1+s_2)+k_{1,2}(s_3+s_4)$$

$$o_2(4)=k_{2,1}(s_1+s_2)+k_{2,2}(s_3+s_4)$$

$$o_3(4)=k_{3,1}(s_1+s_2)+k_{3,2}(s_3+s_4)$$

$$o_4(4)=k_{4,1}(s_1+s_2)+k_{4,2}(s_3+s_4) \quad (17)$$

The digital outputs $o_1(5)$ to $o_4(5)$ in the former half of the third cycle are as follows:

$$o_1(5)=k_{1,1}(s_1+s_2)+k_{1,2}(s_3+s_4)+k_{1,3}s_5$$

$$o_2(5)=k_{2,1}(s_1+s_2)+k_{2,2}(s_3+s_4)+k_{2,3}s_5$$

$$o_3(5)=k_{3,1}(s_1+s_2)+k_{3,2}(s_3+s_4)+k_{3,3}s_5$$

$$o_4(5)=k_{4,1}(s_1+s_2)+k_{4,2}(s_3+s_4)+k_{4,3}s_5 \quad (18)$$

The digital outputs $o_1(6)$ to $o_4(6)$ in the latter half of the third cycle are as follows:

$$o_1(6)=k_{1,1}(s_1+s_2)+k_{1,2}(s_3+s_4)+k_{1,3}(s_5+s_6)$$

$$o_2(6)=k_{2,1}(s_1+s_2)+k_{2,2}(s_3+s_4)+k_{2,3}(s_5+s_6)$$

$$o_3(6)=k_{3,1}(s_1+s_2)+k_{3,2}(s_3+s_4)+k_{3,3}(s_5+s_6)$$

$$o_4(6)=k_{4,1}(s_1+s_2)+k_{4,2}(s_3+s_4)+k_{4,3}(s_5+s_6) \quad (19)$$

The digital outputs $o_1(7)$ to $o_4(7)$ in the former half of the fourth cycle are as follows:

$$o_1(7)=k_{1,1}(s_1+s_2)+k_{1,2}(s_3+s_4)+k_{1,3}(s_5+s_6)+k_{1,4}s_7$$

$$o_2(7)=k_{2,1}(s_1+s_2)+k_{2,2}(s_3+s_4)+k_{2,3}(s_5+s_6)+k_{2,4}s_7$$

$$o_3(7)=k_{3,1}(s_1+s_2)+k_{3,2}(s_3+s_4)+k_{3,3}(s_5+s_6)+k_{3,4}s_7$$

$$o_4(7)=k_{4,1}(s_1+s_2)+k_{4,2}(s_3+s_4)+k_{4,3}(s_5+s_6)+k_{4,4}s_7 \quad (20)$$

The digital outputs $o_1(8)$ to $o_4(8)$ in the latter half of the fourth cycle are as follows:

$$o_1(8)=k_{1,1}(s_1+s_2)+k_{1,2}(s_3+s_4)+k_{1,3}(s_5+s_6)+k_{1,4}(s_7+s_8)$$

$$o_2(8)=k_{2,1}(s_1+s_2)+k_{2,2}(s_3+s_4)+k_{2,3}(s_5+s_6)+k_{2,4}(s_7+s_8)$$

$$o_3(8)=k_{3,1}(s_1+s_2)+k_{3,2}(s_3+s_4)+k_{3,3}(s_5+s_6)+k_{3,4}(s_7+s_8)$$

$$o_4(8)=k_{4,1}(s_1+s_2)+k_{4,2}(s_3+s_4)+k_{4,3}(s_5+s_6)+k_{4,4}(s_7+s_8) \quad (21)$$

The digital outputs $o_1(9)$ to $o_4(9)$ in the former half of the fifth cycle are as follows:

$$o_1(9)=k_{1,1}(s_9+s_2)+k_{1,2}(s_3+s_4)+k_{1,3}(s_5+s_6)+k_{1,4}(s_7+s_8)$$

$$o_2(9)=k_{2,1}(s_9+s_2)+k_{2,2}(s_3+s_4)+k_{2,3}(s_5+s_6)+k_{2,4}(s_7+s_8)$$

$$o_3(9)=k_{3,1}(s_9+s_2)+k_{3,2}(s_3+s_4)+k_{3,3}(s_5+s_6)+k_{3,4}(s_7+s_8)$$

$$o_4(9)=k_{4,1}(s_9+s_2)+k_{4,2}(s_3+s_4)+k_{4,3}(s_5+s_6)+k_{4,4}(s_7+s_8) \quad (22)$$

The digital outputs $o_1(10)$ to $o_4(10)$ in the latter half of the fifth cycle are as follows:

$$o_1(10)=k_{1,1}(s_9+s_{10})+k_{1,2}(s_3+s_4)+k_{1,3}(s_5+s_6)+k_{1,4}(s_7+s_8)$$

$$o_2(10)=k_{2,1}(s_9+s_{10})+k_{2,2}(s_3+s_4)+k_{2,3}(s_5+s_6)+k_{2,4}(s_7+s_8)$$

$$o_3(10)=k_{3,1}(s_9+s_{10})+k_{3,2}(s_3+s_4)+k_{3,3}(s_5+s_6)+k_{3,4}(s_7+s_8)$$

$$o_4(10)=k_{4,1}(s_9+s_{10})+k_{4,2}(s_3+s_4)+k_{4,3}(s_5+s_6)+k_{4,4}(s_7+s_8) \quad (23)$$

Although the digital outputs $o_1(1)$ to $o_4(1)$ to the digital outputs $o_1(7)$ to $o_4(7)$, which are generated until the former half of the fourth cycle, are intermediate calculation values, the digital outputs $o_1(8)$ to $o_4(8)$ and the following digital outputs can be handled as formal digital conversion data of the sense signals. Subsequently, the digital outputs $o_1(9)$ to $o_4(9)$, $o_1(10)$ to $o_4(10)$ . . . are output at the sampling frequency twice as high as that in the case illustrated in FIG. 5.

Embodiment 4

Figure 7:
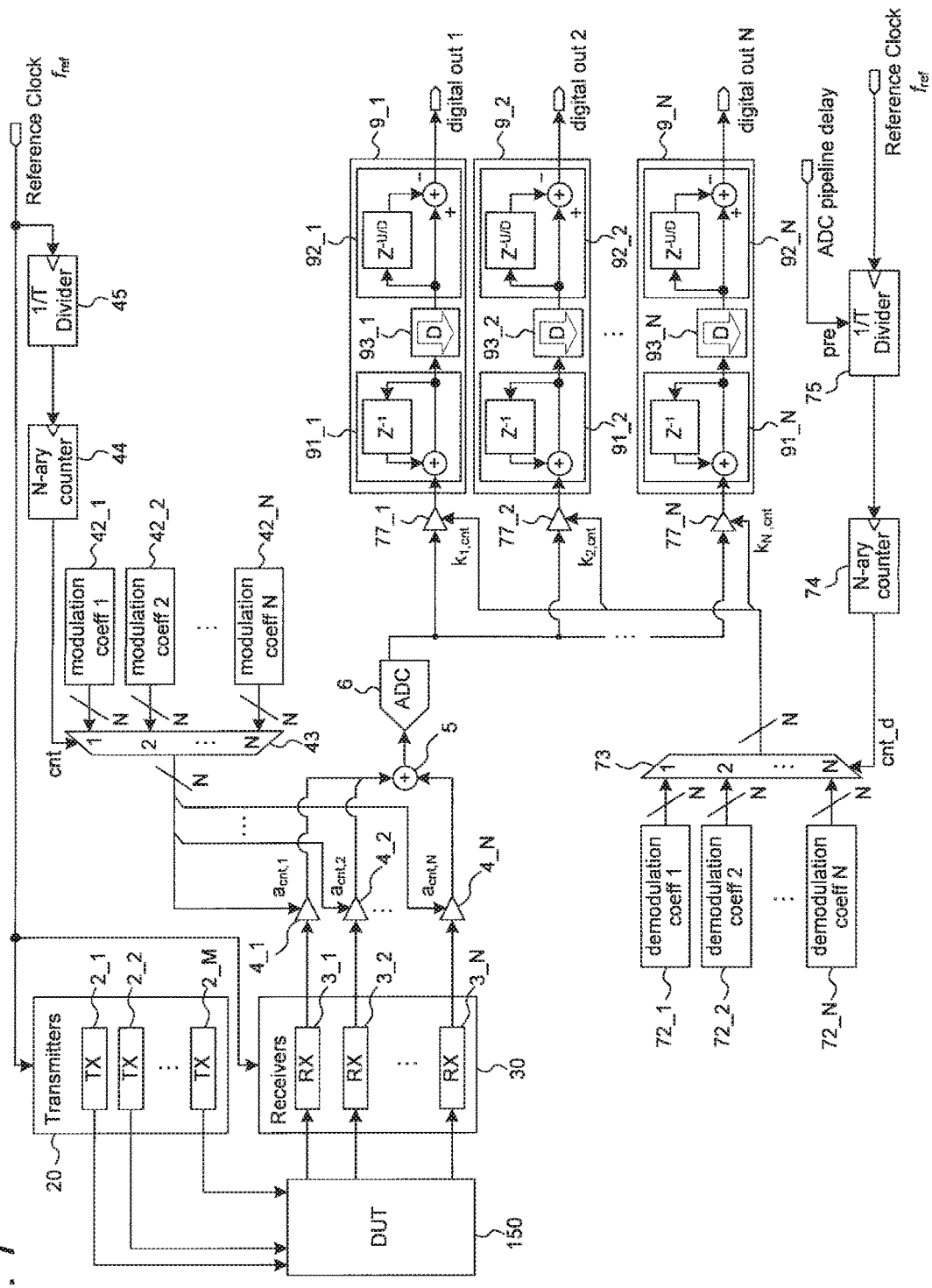
FIG. 7 is a block diagram illustrating a configuration example of a sensing system according to a fourth embodiment.

FIG. 7 is a block diagram illustrating a configuration example of the sensing system 100 in embodiment 4. The sensing target (DUT) 150 includes N sensors 1_1 to 1_N (not illustrated) and the circuit configuration other than the digital filters 9_1 to 9_N is the same as that in embodiment 3 illustrated in FIG. 4; the details are omitted for the circuitries other than the digital filters 9_1 to 9_N.

The digital filters 9_1 to 9_N respectively include first-order integration circuitries 91_1 to 91_N, comb filters 92_1 to 92_N, and 1/D decimator circuitries 93_1 to 93_N disposed therebetween; the first-order integration circuitries 91_1 to 91_N, the 1/D decimator circuitries 93_1 to 93_N and the comb filters 92_1 to 92_N are cascade-connected.

With further reference to the fourth embodiment, the sampling frequency of the A/D converter circuitry 6 may be $f_{ref}/S$ also. The first-order integration circuitries 91_1 to 91_N each calculate the accumulated sum using one cycle delay $Z^{-1}$ synchronous with this sampling frequency $f_{ref}/S$. The sampling frequency is reduced down to $f_{ref}/(S \times D)$ by the 1/D decimator circuitries 93_1 to 93_N, and the comb filters 92_1 to 92_N subtract the values obtained by delaying the accumulated sums by a delay corresponding to N cycles from the accumulated sum received from the first-order integration circuitries 91_1 to 91_N. The comb filters 92_1 to 92_N, which operate at a sampling frequency of $f_{ref}/(S \times D)$, have a delay of $U/D$ ($=(N \times T)/(S \times D)$). The digital filters 9_1 to 9_N thus configured function as moving average filters calculating the moving averages with respect to the N cycle periods, and output the digital outputs $o_1(t)$ to $o_4(t)$ corresponding to the sense signals of the respective channels.

The configuration of the fourth embodiment further provides for a reduction to the circuit size of the demodulation circuitry 70 including the digital filters 9_1 to 9_N, compared with that in embodiment 3. Since the sampling frequency of the following-stage circuitries connected to the outputs of the 1/D decimator circuitries 93_1 to 93_N is reduced down to one $D^{th}$ by the 1/D decimator circuitries 93_1 to 93_N, the delay amounts of the delay circuitries included in the comb filters 92_1 to 92_N are also reduced down to one $D^{th}$. This effectively reduces the circuit size.

Figure 8:
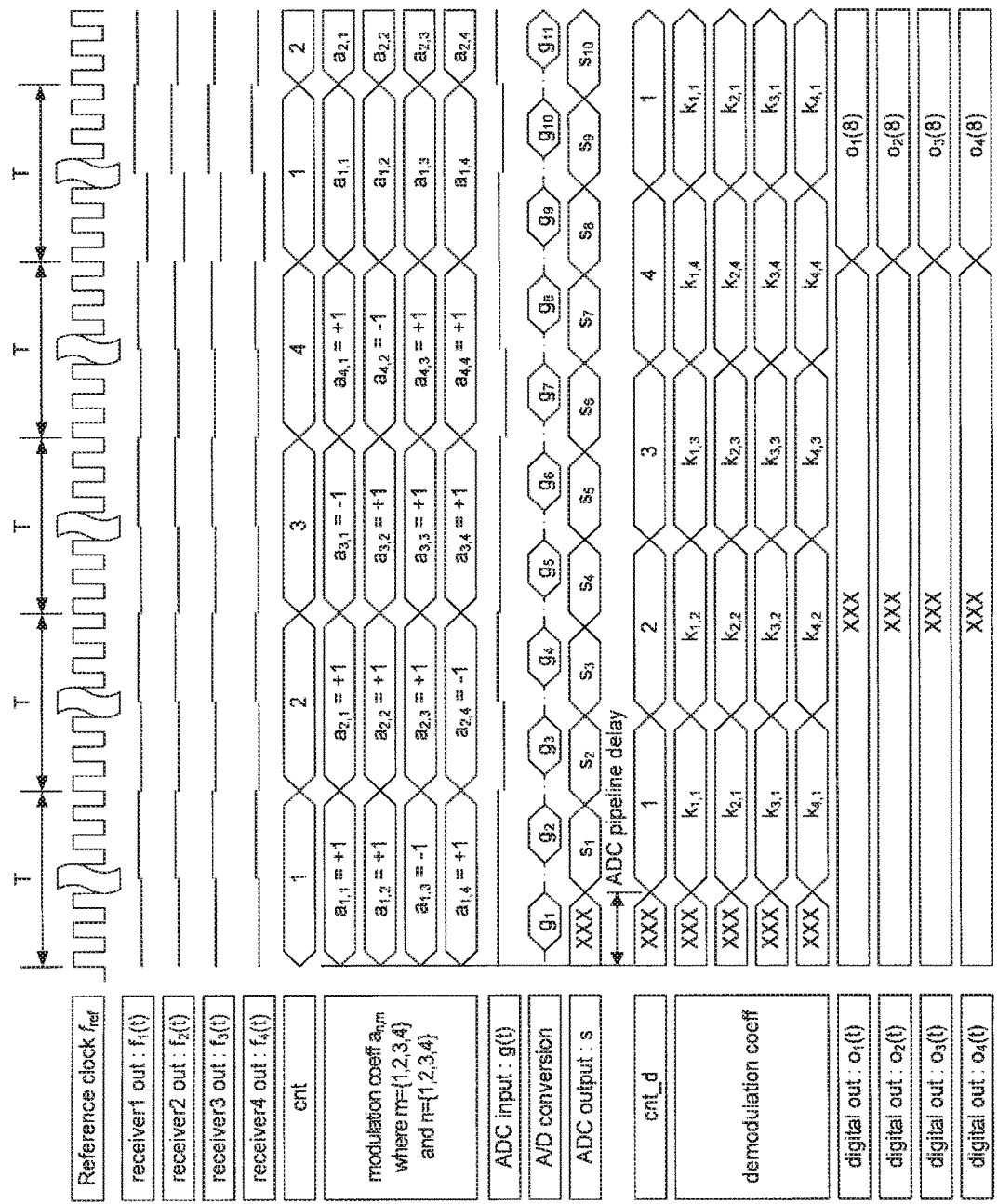
FIG. 8 is a timing chart illustrating an operation example of the sensing system according to the fourth embodiment 4.

FIG. 8 is a timing chart illustrating an operation example of the sensing system 100 according to the fourth embodiment. In this operation example, similarly to the case with FIG. 6, N is four, the modulation coefficients and demodulation coefficients are defined with a cyclic code of {1, 1, −1, 1}, K=2, and S=T/2; however, the output timing of the digital outputs $o_1(t)$ to $o_4(t)$ is different than that in FIG. 6, due to the functions of the 1/D decimator circuitries 93_1 to 93_N.

The digital outputs $o_1(8)$ to $o_4(8)$ generated in the latter half of the fourth cycle, in which all the A/D conversion outputs $s_1$ to $s_8$ are completely prepared, can be handled as formal digital conversion data corresponding to the sense signals. Subsequently, the formal digital conversion data are output in the latter halves of the eighth cycle, sixteenth cycle . . . , at a cycle period of four cycles (not illustrated). Other operations are as illustrated in FIG. 6 and the details are omitted.

Embodiment 5

Figure 9:
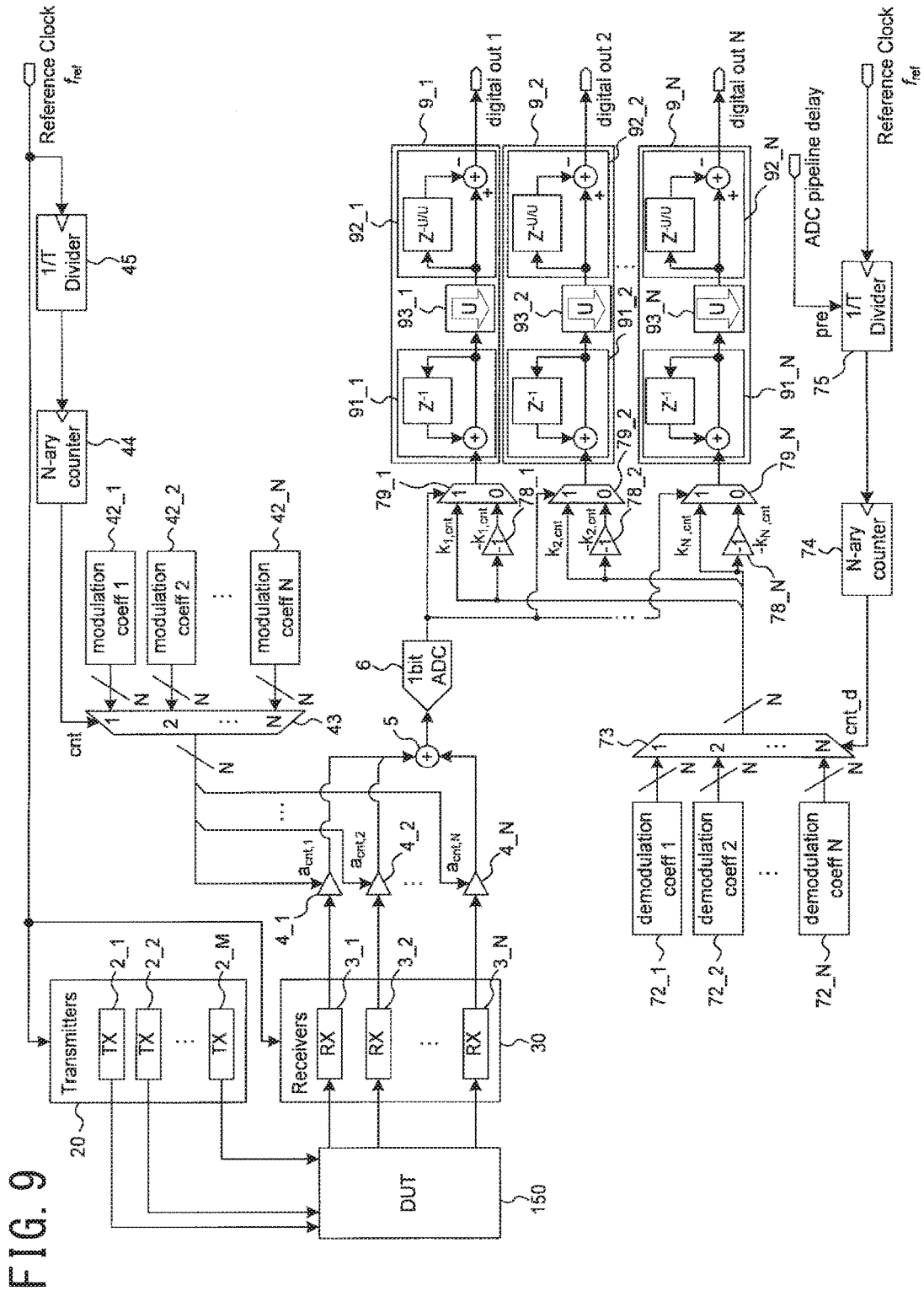
FIG. 9 is a block diagram illustrating a configuration example of a sensing system according to a fifth embodiment.

FIG. 9 is a block diagram illustrating a configuration example of the sensing system 100 in embodiment 5. The sensing target 150 includes N sensors 1_1 to 1_N; the circuit configuration other than the circuitry connected to the output of the A/D converter circuitry 6 is the same as described according to the fourth embodiment illustrated in FIG. 7.

In the fifth embodiment, the A/D converter circuitry 6 is adapted to one-bit delta-sigma A/D conversion. The A/D converter circuitry 6 performs U/N times of sampling per cycle to output one-bit data, "1" or "0".

In connection with this, the sensing system 100 includes sign inversion circuitries 78_1 to 78_N and selectors 79_1 to 79_N, in place of the multiplier circuitries 77_1 to 77_N, which function as a demodulation circuitry. The selectors 79_1 to 79_N supplies to the digital filters 9_1 to 9_N the demodulation coefficients with the original signs or with the signs inverted, in response to the one-bit data "1" or "0" output from the A/D converter circuitry 6.

This eliminates the use of the multiplier circuitries 77_1 to 77_N, largely reducing the circuit size.

Although the operations of the digital filters 9_1 to 9_N are basically same as those described according to the fourth embodiment, the decimator circuitries 93_1 to 93_N are configured to reduce the sampling frequency down to one $U^{th}$. This achieves the same operation as that illustrated in FIG. 8.

Other circuit configurations and operations are the same as those in embodiment 4, described with reference to FIGS. 7 and 8; the details are omitted.

The sign inversion circuitries 78_1 to 78_N, the selectors 79_1 to 79_N and the first-order integration circuitries 91_1 to 91_N, which are the front stages of the digital filters 9_1 to 9_N, may be implemented as up-down counters. The up-down counters adds the values of the elements of the demodulation coefficients when the one-bit output of the A/D converter circuitry 6 is "1" and subtracts the same when the one-bit output of the A/D converter circuitry 6 is "0".

Embodiment 6

The sensing systems described in any of the above embodiments, including modifications thereof, may be widely applied to sensing systems which repeatedly supply the same stimulations (drive signals) to the sensors and receive repeated response signals generated in response to the stimulations. Such sensing systems may include a sensing system configured to irradiate supersonic wave or electromagnetic wave and observe the reflected wave.

In one embodiment, the above-described technique may be applied to a touch sensing circuitry for a touch panel adapted to a capacitive touch sensing.

Touch panels adapted to capacitive touch sensing include self-capacitance touch panels and mutual capacitance touch panels; the above-described technique is applicable to both of the self-capacitance and mutual capacitance touch panels.

Figure 10:
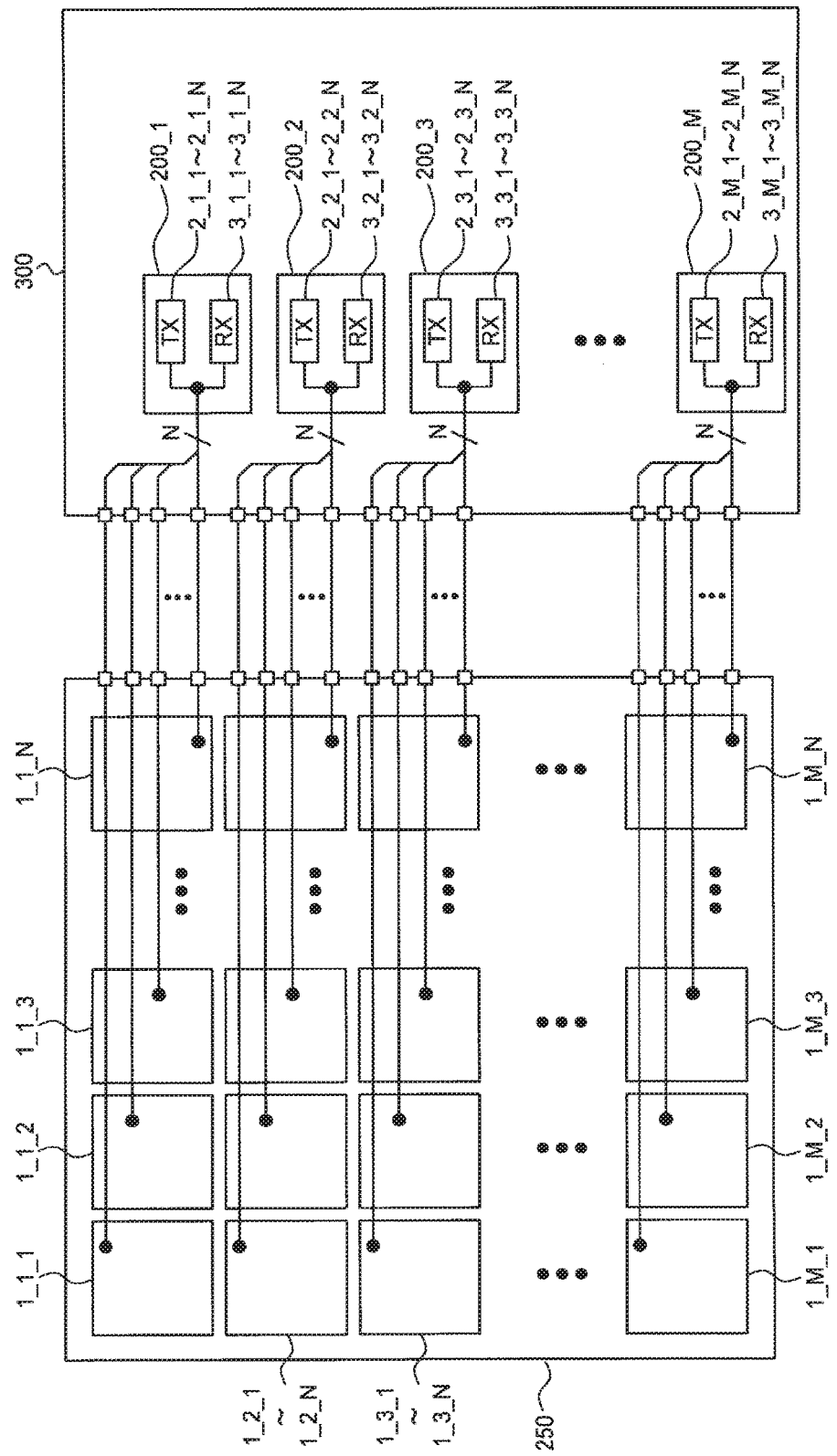
FIG. 10 is a block diagram schematically illustrating a sensing system according to one or more embodiments.

FIG. 10 is a block diagram schematically illustrating one embodiment in which a sensing system 100 of this disclosure is used as a touch sensing circuitry adapted to self-capacitance touch sensing.

In this system, a self-capacitance touch panel 250 is connected to a semiconductor device 300 which includes a plurality of touch sensing circuitries 200_1 to 200_M.

The self-capacitance touch panel 250 includes M×N sensor capacitors. Although the M×N sensor capacitors are illustrated as being arranged in N rows and M columns in the figure for easiness of understanding, the arrangement may be modified as desired. Only one of the electrodes of each of the M×N sensor capacitors is illustrated; the other electrode, not illustrated, is disposed electromagnetically opposed to the entire touch panel and functions as the common electrode. When a conductive object such as a user's finger approaches towards a sensor capacitor, the effective capacitance of the sensor capacitor is increased by the capacitance component generated between the sensor capacitor and the conductive object.

The semiconductor device 300 may include M×N terminals and M touch sensing circuitries 200_1 to 200_M, and may be configured to electrically connect the M×N sensor capacitors on the touch panel 250 to the touch sensing circuitries 200_1 to 200_M via the M×N terminals. Each of the touch sensing circuitries 200_1 to 200_M are associated with N sensor capacitors 250 on the touch panel 250 and functions as a sensing system 100 as described in embodiments 1 to 5.

The touch sensing circuitry 200_1 may include N transmitter circuitries 2_1_1 to 2_1_N, N receiver circuitries 3_1_1 to 3_1_N, and may additionally include one or more of a modulation circuit, a mixer circuitry, an A/D converter circuitry, a demodulation circuitry and digital filters, which are not illustrated. In one or more embodiments, the outputs of the N transmitter circuitries 2_1_1 to 2_1_N and the N receiver circuitries 3_1_1 to 3_1_N are respectively short-circuited and connected to N sensor capacitors via N terminals. Drive signals, which are voltage signals, are output from the outputs of the transmitter circuitries 2_1_1 to 2_1_N to the sensor capacitors 1_1_1 to 1_1_N, and the resultant charging and discharging currents of the sensor capacitors 1_1_1 to 1_1_N are received as sense signals by the N receiver circuitries 3_1_1 to 3_1_N. The following signal processing is as described in embodiments 1 to 5. Other touch sensing circuitries 200_2 to 200_M may be configured in a similar way.

The M touch sensing circuitries 200_1 to 200_M can operate independently of one another. This allows performing sensing with respect to a plurality of sensor capacitors at the same time. In one embodiment all of the M×N sensor capacitors disposed on the touch panel 250 may be operated at the same time.

Figure 11:
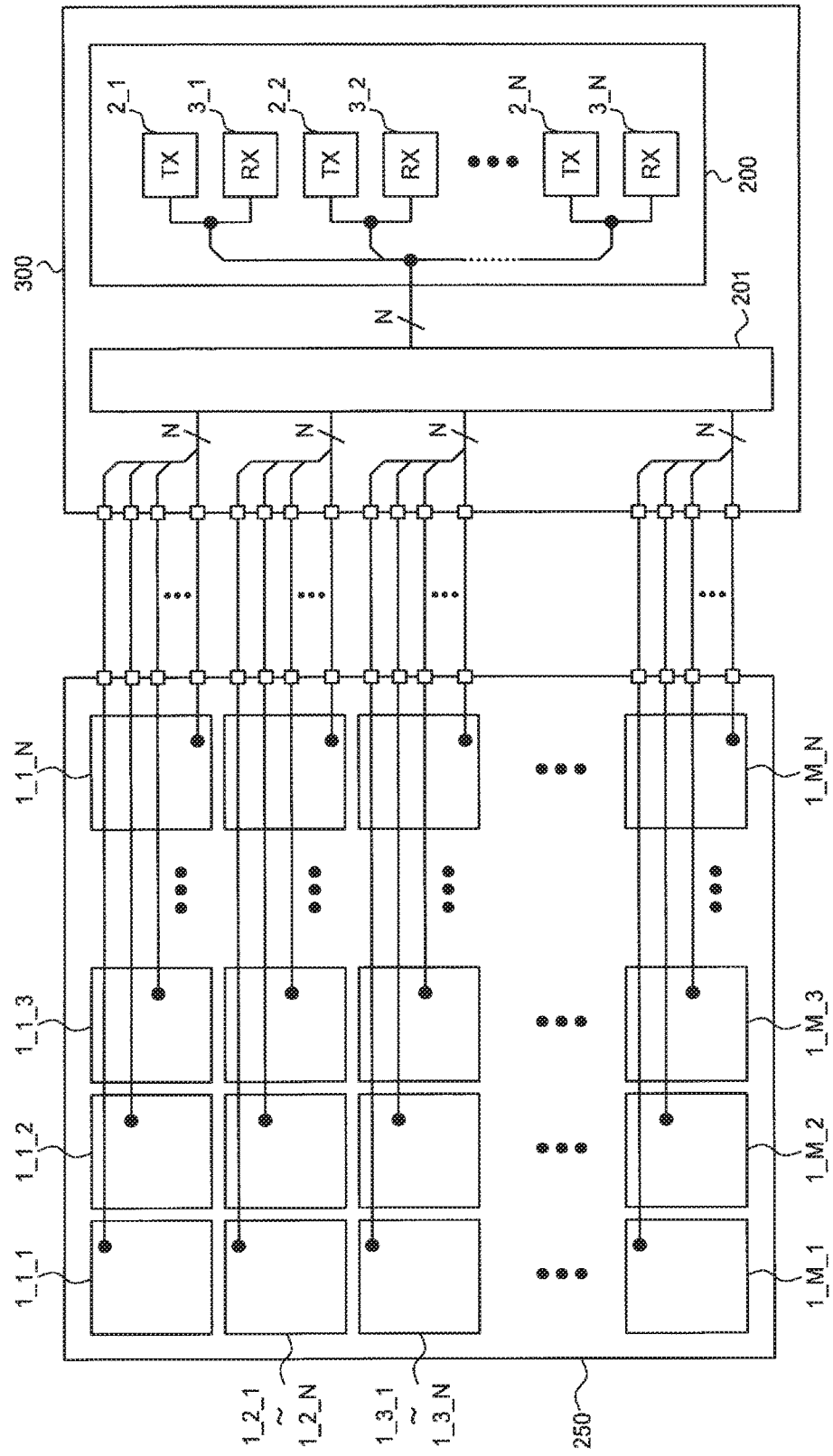
FIG. 11 is a block diagram schematically illustrating a of a sensing system according to one or more embodiments.

FIG. 11 is a block diagram schematically illustrating another embodiment in which a sensing system of this disclosure is applied to a touch sensing circuitry adapted to self-capacitance touch sensing.

In this system, a self-capacitance touch panel 250 is connected to a semiconductor device 300 which includes a multiplexer 201 and a touch sensing circuitry 200.

The semiconductor device 300 may include M×N terminals, in addition to the multiplexer 201 and the touch sensing circuitry 200. The semiconductor device 300 may be configured to sequentially select N of the M×N sensor capacitors disposed on the touch panel 250 by the multiplexer 201 via the M×N terminals, and electrically connect the selected N sensor capacitors to the touch sensing circuitry 200 to achieve sensing with respect to the same.

The touch sensing circuitry 200 may include N transmitter circuitries 2_1 to 2_N, N receiver circuitries 3_1 to 3_N, and additionally may include one or more of a modulation circuit, a mixer circuitry, an A/D converter circuitry, a demodulation circuitry and digital filters, which are not illustrated. The outputs of the N transmitter circuitries 2_1 to 2_N and the N receiver circuitries 3_1 to 3_N are respectively short-circuited, and electrically connected to N sensor capacitors selected by the multiplexer 201. The multiplexer 201 may include N bidirectional analog switches, for example. Drive signals generated as voltage signals are output from the outputs of the transmitter circuitries 2_1 to 2_N to the selected N sensor capacitors, and the resultant charging and discharging currents of the N sensor capacitors are received as the sense signals by the N receiver circuitries 3_1 to 3_N. The following signal processing is as described in embodiments 1 to 5.

It would be understood FIG. 10 illustrates a completely-parallel scheme and FIG. 11 illustrates a time divisional scheme. In one embodiment, a hybrid of these schemes may be used. For example, the sensor capacitors on the touch panel 250 may be grouped into L sets, each set including M×N sensor capacitors and the semiconductor device 300 may include L multiplexer 201_1 to 201_L and L touch sensing circuitries 200_1 to 200_L. The multiplexers may be disposed at a position between the receiver circuitries and the modulation circuitries, at a position in the following stage of the A/D converter circuitry or at other desired positions, not limited to the position beside the terminals.

Figure 12:
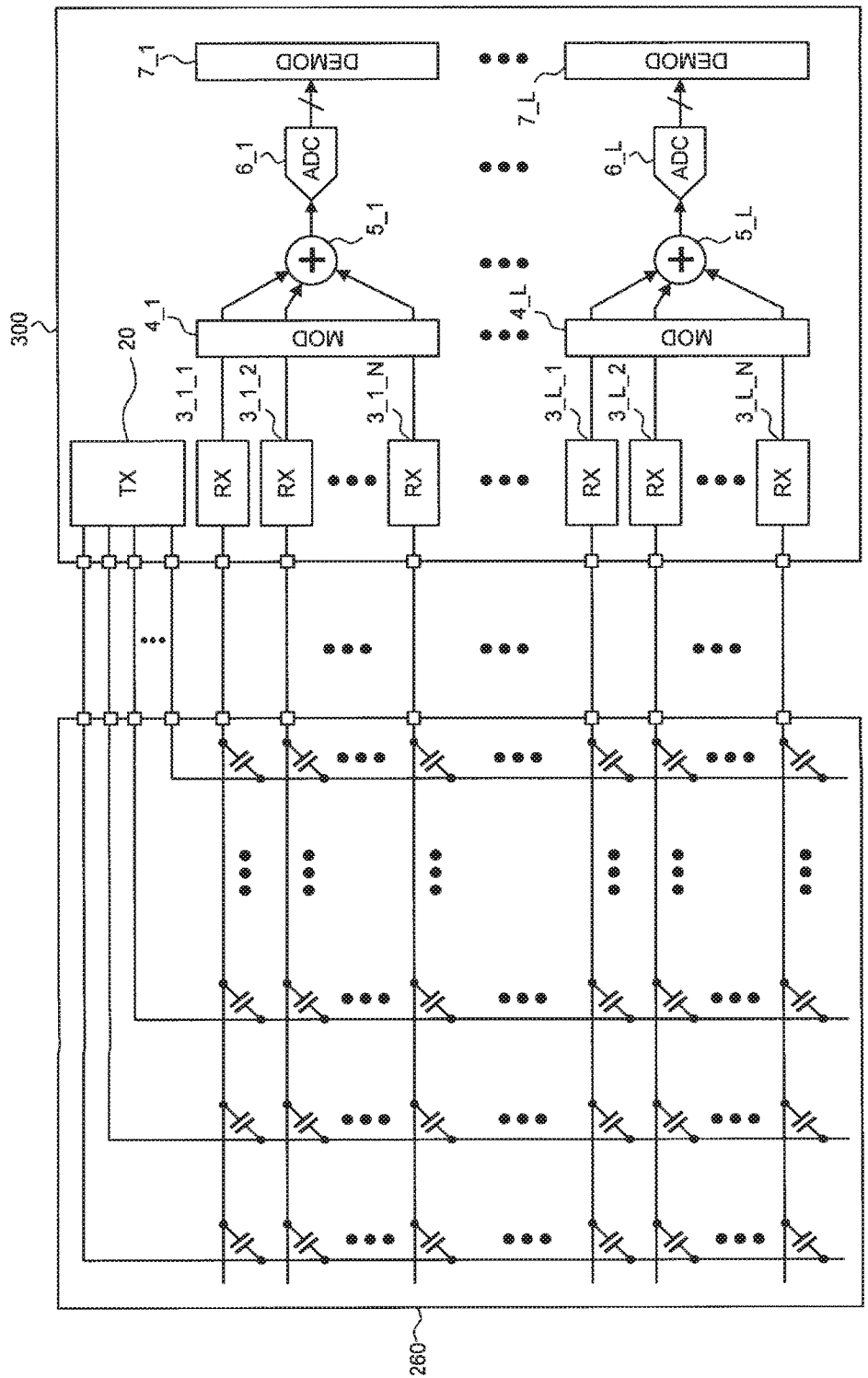
FIG. 12 is a block diagram of a sensing system according to one or more embodiments.

FIG. 12 is a block diagram schematically illustrating one embodiment in which a sensing system 100 of the present disclosure is applied to a touch sensing circuitry adapted to mutual capacitance touch sensing.

In this system, a mutual capacitance touch panel 260 is connected to a semiconductor device 300 including a plurality of touch sensing circuitries.

The mutual capacitance touch panel 260 includes X×L×N sensor capacitors at respective intersections of X drive electrodes and L×N sensing electrodes. When a conductive object such as a user's finger approaches toward a sensor capacitor, the capacitance component existing between the conductive object and the sensor capacitor is redistributed and the effective capacitance of the sensor capacitor is thereby reduced.

The semiconductor device 300 includes: a transmitter circuitry 20; L sets of receiver circuitries 3_1_1 to 3_L_N, each set including N receiver circuitries; L modulation circuitries 4_1 to 4_L, L mixer circuitries 5_1 to 5_L; L A/D converter circuitries 6_1 to 6_L; and L demodulation circuitries 7_1 to 7_L. The semiconductor device 300 further includes X terminals for connecting the X drive electrodes to the transmitter circuitry 20 and L×N terminals for connecting the L×N sensing electrodes and L sets of the receiver circuitries 3_1_1 to 3_L_N. No boundary defining the sensing system 100 and the touch sensing circuitry 200 is illustrated in FIG. 12, because one transmitter circuitry 20 is shared by the L touch sensing circuitries 200_1 to 200_L. The first touch sensing circuitry 200_1 is constituted by the receiver circuitries 3_1_1 to 3_1_N, the modulation circuitry 4_1, the mixer circuitry 5_1, the A/D converter circuitry 6_1, the demodulation circuitry 7_1 and the common transmitter circuitry 20. The similar goes for other touch sensing circuitries. The $L^{th}$ touch sensing circuitry 200_L is constituted by the receiver circuitries 3_L_1 to 3_L_N, the modulation circuit 4_L, the mixer circuitry 5_L, the A/D converter circuitry 6_L, the demodulation circuitry 7_L and the common transmitter circuitry 20.

The semiconductor device 300 sequentially transmits drive signals to the X drive electrodes on the touch panel 260 from the transmitter circuitry 20, and thereby achieves sensing with respect to the L×N sensor capacitors connected to each drive electrode. The semiconductor device 300 operates the L touch sensing circuitries 200_1 to 200_L in parallel, and sequentially achieves sensing with respect to the X×L×N sensor capacitors in units of L×N sensor capacitors. The operations of the touch sensing circuitries 200_1 to 200_L are as described in embodiments 1 to 5.

Figure 13:
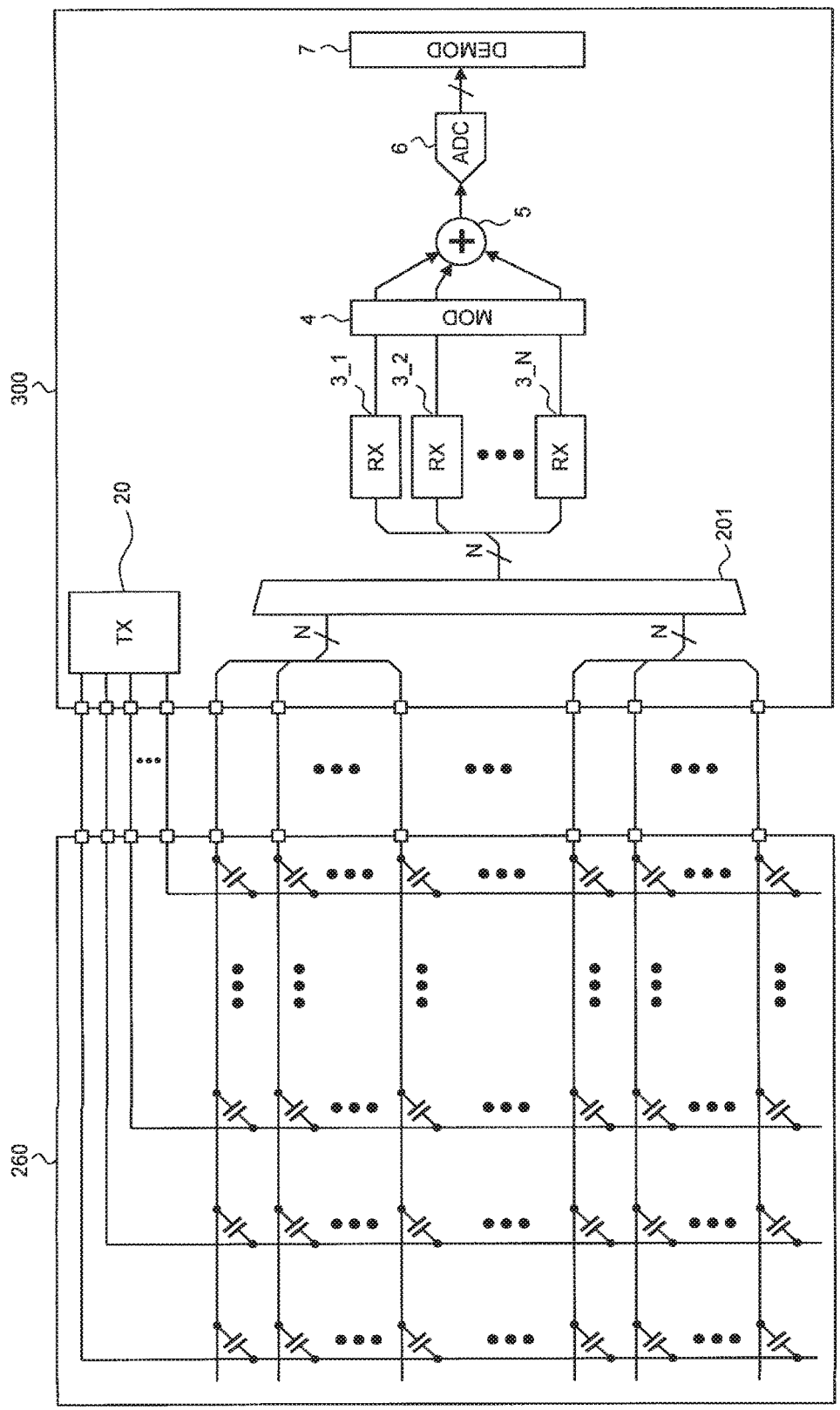
FIG. 13 is a block diagram schematically illustrating a sensing system according to one or more embodiments.

FIG. 13 is a block diagram schematically illustrating another embodiment in which a sensing system 100 of the present disclosure is applied to a touch sensing circuitry adapted to mutual capacitance touch sensing.

In this system, a mutual capacitance touch panel 260 is connected to a semiconductor device 300 as is the case of FIG. 12, and the semiconductor device 300 includes a multiplexer 201 and a touch sensing circuitry 200.

The semiconductor device 300 includes X terminals, a transmitter circuitry 20, L×N terminals, a multiplexer 201, receiver circuitries 3_1 to 3_N, a modulation circuit 4, a mixer circuitry 5, an A/D converter circuitry 6, and a demodulator circuit 7. The semiconductor device 300 is configured to sequentially select N of the L×N sensor capacitors disposed on the touch panel 260 by the multiplexer 201 via the L×N terminals and electrically connect the selected N sensor capacitors to the receiver circuitries 3_1 to 3_N to achieve sensing. The semiconductor device 300 sequentially transmits drive signals to the X drive electrodes on the touch panel 260 from the transmitter circuitry 20, and thereby drives the L×N sensor capacitors connected to each drive electrode. The L×N sensor capacitors driven in parallel are sequentially selected by the multiplexer 201 in units of N sensor capacitors, and connected to the receiver circuitries 3_1 to 3_N to achieve sensing. The following operations are as described in the first to fifth embodiments.

It would be understood FIG. 12 illustrates a completely parallel scheme and FIG. 13 illustrates a time divisional scheme. In one embodiment, a hybrid of these schemes may be used.

The semiconductor device 300 may be formed, for example, as an LSI (large scale integrated circuit) or an IC (integrated circuit) on a monolithic semiconductor substrate of silicon or the like, through a known semiconductor manufacture technology of CMOSs (Complementary Metal-Oxide-Semiconductor field effect transistors), although not limited to this.

Although embodiments of the present disclosure have been specifically described in the above, it would be apparent that the present disclosure may be implemented with various modifications without departing from the concept of the present disclosure.

What is claimed is:

1. A sensing system, comprising:
   transmitter circuitry configured to transmit drive signals to N sensors, N being a positive integer;
   N receiver circuitries configured to receive in parallel N sense signals generated in response to the drive signals by the N sensors;
   N modulation circuitries configured to modulate outputs of the N receiver circuitries;

mixer circuitry configured to mix outputs of the N modulation circuitries;

A/D converter circuitry configured to receive an output of the mixer circuitry; and demodulation circuitry configured to demodulate an output of the A/D converter circuitry to generate N digital sense values corresponding to the N sense signals.

2. The sensing system according to claim 1,
wherein the transmitter circuitry is configured to repeatedly transmit the drive signals to the N sensors, respectively, at least over N cycles, and
wherein the N receiver circuitries are configured to respectively receive the N sense signals over the N cycles.

3. The sensing system according to claim 2,
wherein the N modulation circuitries are configured to perform code-modulation on the outputs of the N receiver circuitries, respectively.

4. The sensing system according to claim 2, wherein each of the N cycles is based on modulation coefficients represented by an N-row and N-column matrix; and
wherein the N modulation circuitries are further configured to sequentially supply to the mixer circuitry N products obtained by multiplying the N sense signals and respective elements of the matrix in the first to $N^{th}$ rows, respectively.

5. The sensing system according to claim 4,
wherein the mixer circuitry is further configured to calculate a sum of N products in each of the N cycles and supply the calculated sum to the A/D converter circuitry over the N cycles.

6. The sensing system according to claim 5,
wherein the A/D converter circuitry is further configured to sequentially output a digital value corresponding to the output of the mixer circuitry in each of the N cycle, to thereby output N digital signals over the N cycles,
wherein the demodulation circuitry is further configured to receive demodulation coefficients represented by an N-row and N-column matrix which is orthogonal to the matrix of the modulation coefficients, and
wherein the demodulation circuitry is further configured to use the N digital signals supplied over the N cycle as an N-row and one-column input matrix and output the N digital sense values by multiplying the demodulation coefficients and the N-row and one-column input matrix.

7. The sensing system according to claim 6,
wherein the demodulation circuitry comprises:
N−1 serially-connected delay circuitries configured to delay the N digital signals supplied over the N cycles by one cycle; and
N product-sum calculation circuitries configured to output the N digital sense values by multiplying outputs of the A/D converter circuitry and N−1 serially-connected delay circuitries by the N elements of each of the first to $N^{th}$ rows of the demodulation coefficients to generate products and accumulating the products.

8. The sensing system according to claim 6,
wherein the A/D converter circuitry is further configured to perform delta-sigma conversion operations K times in each of the N cycles and output K digital data as the digital signals in each cycle over the N cycles,
wherein the demodulation circuitry further comprises N multiplier circuitries and N filter circuitries configured to receive the outputs of the N multiplier circuits, respectively, and wherein each of the filter circuitries further comprises a first-order integration circuit and a K×N-order comb filter which are cascade-connected.

9. The sensing system according to claim 6,
wherein the A/D converter circuitry is further configured to perform delta-sigma conversion operations K times in each of the N cycles, and output K digital data as the digital signals in each cycle over the N cycles,
wherein the demodulation circuitry further comprises N multiplier circuitries and N filter circuitries configured to receive the outputs of the N multiplier circuitries, respectively, and
wherein each of the filter circuitries further comprises a first-order integration circuit, a 1/D decimator circuit and a K×N/D-order comb filter, which are cascade-connected.

10. The sensing system according to claim 6,
wherein the A/D converter circuitry is further configured to perform delta-sigma conversion operations K times in each of the N cycles, and output K one-bit digital data as the digital signals in each cycle over the N cycles,
wherein the demodulation circuitry further comprises N multiplier circuitries and N filter circuitries configured to receive the outputs of the N multiplier circuitries, respectively, and
wherein each of the filter circuitries further comprises a first-order integration circuit, a 1/D decimator circuit and a K×N/D-order comb filter which are cascade-connected.

11. The sensing system according to claim 6,
wherein the A/D converter circuitry is further configured to perform delta-sigma conversion operations K times in each of the N cycles, and output K one-bit digital data as the digital signals in each cycle over the N cycles,
wherein the demodulation circuitry further comprises a counter which adds or subtracts the K one-bit digital data over the N cycles based on the values of the N elements of each of the N rows of the demodulation coefficients.

12. The sensing system according to claim 11,
wherein D is equal to N×K.

13. The sensing system according to claim 2,
wherein a waveform of each of the drive signals in each of the N cycle is unchanged over the N cycles.

14. A semiconductor device, comprising:
a transmitter circuitry configured to transmit drive signals to N sensor capacitors of a touch panel, N being a positive integer;
N receiver circuitries configured to receive in parallel N sense signals generated in response to the drive signals by the N sensor capacitors;
N modulation circuitries configured to modulate outputs of the N receiver circuitries;
a mixer circuitry configured to mix outputs of the N modulation circuitries;
an A/D converter circuitry configured to receive an output of the mixer circuitry; and
a demodulation circuitry configured to demodulate an output of the A/D converter circuitry to generate N digital sense values corresponding to the N sense signals.

15. The semiconductor device according to claim 14,
wherein the transmitter circuitry is further configured to repeatedly transmit the drive signals to the N sensors, respectively, at least over N cycles, and wherein the N receiver circuitries are further configured to respectively receive the N sense signals over the N cycles.

16. The semiconductor device according to claim 15, wherein each of the N cycles is based on modulation coefficients represented by an N-row and N-column matrix; and
wherein N modulation circuitries are further configured sequentially supply to the mixer circuitry N products obtained by multiplying the N sense signals by respective elements of the first to $N^{th}$ rows of the modulation coefficients, respectively.

17. The semiconductor device according to claim 14, further comprising:
a multiplexer; and
M sets of terminals, each set including N terminals for M being a positive integer,
wherein the touch panel comprises M×N sensor capacitors associated with the M×N terminals,
wherein the multiplexer is configured to sequentially select N terminals from the respective M sets of the terminals and sequentially connect the associated N sensor capacitors to the touch sensing circuitry.

18. The semiconductor device according to claim 14, further comprising:
M touch sensing circuitries each including the transmitter circuitry, the N receiver circuitries, the N modulation circuitries, the mixer circuitry, the A/D converter circuitry, and the demodulation circuitry; and
M×N terminals,
wherein the touch panel comprises M×N capacitors respectively connected to the M×N terminals, and wherein M×N terminals provide connections between the M touch sensing circuitries and the M×N capacitors.

19. The semiconductor device according to claim 14, further comprising:

X transmitting terminals, X being a positive integer; and
L×N receiving terminals;
wherein the touch panel comprises a mutual capacitance touch panel comprising X rows of sensor capacitors, each row including L×N sensor capacitors,
wherein the L×N sensor capacitors of each of the X rows are connected to the L×N receiving terminals, respectively,
wherein the transmitter circuitry is configured to sequentially transmit the drive signals to the respective X rows of the sensor capacitors from the X transmitting terminals, and
wherein the touch sensing circuitry further comprises L circuit sets each comprising the N receiver circuitries, the modulation circuitry, the mixer circuitry, the A/D converter circuitry and the demodulation circuitry, to accommodate N of the L×N receiving terminals.

20. The semiconductor device according to claim 15, further comprising:
X transmitting terminals, X being a positive integer;
L sets of receiving terminals, each set comprising N receiving terminals, L being a positive integer; and
a multiplexer,
wherein the touch panel comprises a mutual capacitance touch panel comprising X rows of sensor capacitors, each row including L×N sensor capacitors,
wherein the L×N sensor capacitors of each of the X rows are respectively connected to the L×N receiving terminals, respectively,
wherein the transmitter circuitry is configured to sequentially transmit the drive signals to each of the X rows of sensor capacitors from the X transmitting terminals, and
wherein the multiplexer is configured to sequentially forwards N sense signals supplied to N receiving terminals of each of the L sets of receiving terminals to the N receiver circuitries.

* * * * *